US009892185B2

(12) United States Patent
Bruening et al.

(10) Patent No.: US 9,892,185 B2
(45) Date of Patent: Feb. 13, 2018

(54) METHOD AND SYSTEM FOR SYNCING DATA STRUCTURES

(71) Applicant: PROJECTWIZARDS GMBH, Melle (DE)

(72) Inventors: Kai Bruening, Erkrath (DE); Frank Illenberger, Frankfurt am Main (DE)

(73) Assignee: ProjectWizards GmbH, Melle (DE)

( * ) Notice: Subject to any disclaimer, the term of this patent is extended or adjusted under 35 U.S.C. 154(b) by 742 days.

(21) Appl. No.: 14/462,944

(22) Filed: Aug. 19, 2014

(65) Prior Publication Data
US 2016/0055226 A1 Feb. 25, 2016

(51) Int. Cl.
*G06F 17/30* (2006.01)
(52) U.S. Cl.
CPC .. *G06F 17/30581* (2013.01); *G06F 17/30309* (2013.01); *G06F 17/30368* (2013.01); *G06F 17/30958* (2013.01)
(58) Field of Classification Search
CPC .................................. G06F 17/30581
USPC ............................................ 707/611
See application file for complete search history.

(56) References Cited

U.S. PATENT DOCUMENTS 8,527,440 B2 * 9/2013 Hettel ................. G06Q 10/103
706/45

OTHER PUBLICATIONS

"Undo as Concurrent Inverse in Group Editors", by: Chengzheng Sun, Published 2002 http://delivery.acm.org/10.1145/590000/586085/p309-sun.pdf?ip=151.207.250.41&id=586085&acc=ACTIVE%20SERVICE&key=C15944E53D0ACA63%2E4D4702B0C3E38B35%2E4D4702-B0C3E38B35%2E4D4702B0C3E38B35&CFID=763072931&CFTOKEN=30023943&__acm__=1494859650_549c7f7f4887796af6fc185c11705ae.*
Undo as Concurrent Inverse in Group Editors, by: Sun, Published 2002; http://delivery.acm.org/10.1145/590000/586085/p309-sun.pdf?ip=151.207.250.61&id=586085&acc=ACTIVE%20SERVICE&key=C15944E53D0ACA63%2E4D4702B0C3E38B35%2E4D-4702B0C3E38B35%2E4D4702B0C3E38B35&CFID=986290387&CFTOKEN=15667352&__acm__=.*
Continuation of document U from above—1505759273_1fc5d6f79cf71f5e71dca91852ced3a9.*

* cited by examiner

*Primary Examiner* — Chelcie Daye
(74) *Attorney, Agent, or Firm* — Laurence A. Greenberg; Werner H. Stemer; Ralph E. Locher

(57) ABSTRACT

The consistency of a data structure is maintained where changes in the form of atomic operations are requested by more than one user to an object graph containing a plurality of objects. Operational transformations specifying how one atomic operation is transformed against another one are accessed and the object graph is modified with the first and second set of changes by employing the operational transformations on the atomic operations and applying the resulting transformed operations to the object graph. The transformed operations are recorded in a history log. The atomic operations are object operations that create or delete an object of the object graph and/or property operations changing a property of an object. Each operation retains the identifier of the object it acts on and information on each change of the object resulting from the operation. Multi-operation conflicts are resolved by defined conflict resolution events.

25 Claims, 9 Drawing Sheets

METHOD AND SYSTEM FOR SYNCING DATA STRUCTURES

BACKGROUND OF THE INVENTION

Field of the Invention

The invention relates to a method and a system for syncing data structures. It also relates to a non-transitory computer-readable storage device. It also relates to a non-transitory computer-readable storage medium. It also relates to a computer program product. It also relates to a system, a computer and a collaborative system.

Background Art

As the Internet and the mobile smartphone and tablet market grow, more and more computer applications offer their users the capability to collaboratively work on shared data, such as text documents or any other data that represent the data structure of an application. In addition, users get used to work on these data on different devices such as desktop computers and various mobile devices. To make these applications easy to operate for its users, it is desirable that they offer at least some of the following features:

a) Unblocked Collaboration

A user working with the system should not block others from accessing or changing data. This should ideally include working on the same piece of information.

b) Consistent Merge and Intention Preservation

If multiple users are allowed to concurrently work on the same pieces of information, the system needs to be able to merge these changes. Merging needs to produce the same result for all users (convergence) and should strive to conserve as much of the users' original intentions as possible. The merged data needs to be valid in the context of the application logic.

c) Offline Collaboration

Users want to access applications from their mobile devices like laptop computers, smartphones or tablets. These devices often operate in slow or unstable networking environments like cellular networks or are often completely offline for short periods like in subway trains or for longer periods like in airplanes or holiday homes. Users still expect to be able to work with their applications even in these situations; therefore they need to support offline collaboration.

If an application does not fulfill the requirement A (unblocked collaboration), blocking becomes even worse when users go offline for longer periods of time.

d) Undo Changes

In an application, changes performed by one user can immediately affect others. As many applications tend to be complex, it is hard for users to always correctly predict the effect of their changes. It therefore greatly eases the use of an application if changes can always be undone.

Traditional undo mechanisms are linear, meaning that changes have to be undone in the opposite order in which they were originally performed. For a user it is however desirable to be able to arbitrarily undo older changes without also having to undo the following actions. In a collaborative environment this so-called non-linear undo mechanism is mandatory, as changes from a user get interleaved with changes from others so that undoing only one's own changes requires skipping the changes of others.

e) Auto Save

All the changes a user performs on the data should be saved automatically without any interaction needed from the user. This is especially important for memory constrained mobile devices in which the work is likely to be interrupted. An incoming call for example should not result in data loss when the smartphone needs to terminate the application.

Auto-saving should also enable the user to switch the device he is using while working on a change: A user might want to begin his work in the office on a desktop computer and finish it on his way home on his smartphone.

f) Publishing Independent from Saving

When a user wants to perform a complex change to shared data, he may want to perform multiple editing steps before he feels ready to share his changes with others. Therefore, publishing his changes to others ideally is independent from saving the changes and syncing them with other personal devices.

g) Audit Trail

If data is business critical, it is desirable to have a chronological record of the sequence of activities that changed the data. Therefore an application should record all user actions as events and changes as a so called audit trail. This increases the security of an application and even enables controlling workflows in which changes need to be reviewed.

There are many methods for syncing data between multiple users, which do not, however, fulfill all of the requirements described above. In the following, some of the common methods known from the art are described, and their features and problems are highlighted.

A. File Based Syncing

Popular syncing services like Dropbox or iCloud offer to sync changes that users perform on files. But as the semantics of the file contents are unknown to the syncing machinery, these services are not able to merge changes that are concurrently performed on a single file and leave it up to the application logic to solve the hard problem. These systems are only a direct solution if the data can be separated into independent files, which is rarely the case. The method of file based syncing hence only fulfills requirements a and c.

B. Central Online Server with Pessimistic Locking

Traditional enterprise applications are built around a central database server to which all users (clients) have a persistent online connection. The data stored on the server is divided into independent records, which can be edited independently by different users. As long as a user edits a record, it gets locked, which means another user cannot edit it. Once the user has finished editing, the changes are immediately visible to other users and the record gets unlocked. This common approach does not fulfill requirements a, b, c, d, e, f and g. It is also unsuitable for designs in which there are strong dependencies between objects because it needs to lock records independently.

C. Central Online Server with Optimistic Locking and Merging

A variant of the above approach is optimistic locking in which users are allowed to simultaneously edit the same pieces of data and the system is able to detect it. The system then needs to merge the individual changes, however, it has no information for performing a merge that fulfills requirement b. Most commonly, merges are performed on a field-by-field basis. The optimistic locking approach is common in object-relational mappers that persist data from object-graphs into relational databases. It fulfills requirement a but not b, c, d, e, f and g.

D. Key-Value Databases

During recent years, key-value or so-called NoSQL databases have become very popular and many web-based applications are nowadays built around them. These databases also perform merging on a field-by-field basis so that cross-dependencies between fields cannot be respected during a merge. This allows only for very simple data models. More sophisticated merging is possible with these databases but the problem is then shifted upwards to the application logic. Requirements a and c can be fulfilled but requirements b, d, e, f and g cannot be fulfilled. The popular iCloud syncing service from Apple, for instance, also offers a key-value database for syncing simple application data between iPhones and Macs.

E. System Prevalence

A successful approach for capturing more of the user's intentions is to store the whole history of user actions that led to the state of an object graph, which is employed to represent application data, in addition to the object graph itself. This history is often called history log, log or journal. When merging, action events originating from other users are applied to a user's object graph, which improves the quality of merges. For example: If two users concurrently add an object to a to-many relationship, a simple state-based merge would result in only one of the objects being added. A merge based on replaying of both events preserves the intentions and results in both objects being added.

However, in this scheme actions recorded by one user get transferred and applied to the state of another user which may not be the same as the one in which the action originated. This can lead to lots of consistency and convergence problems.

If prepared well, the log can enable linear undo by replaying the recorded actions in reverse. But it still does not allow for undoing changes in non-linear fashion.

The log can also serve as the source for audit trail information. The system prevalence pattern fulfills requirements a, c and g but not b, d, e, and f. Popular cloud syncing services like iCloud or Dropbox offer stores that are implemented using the system prevalence pattern.

F. Differential Synchronization

Even without an explicit event log, it is possible to derive the user actions by performing a delta comparison of two object-graph states. Such derived actions may capture the user's original intention well if the differences are small. This immediately requires that clients be permanently connected to a server. Offline work would lead to greater differences from which the original actions cannot be derived reliably. A differential synchronization system also needs to be able to apply derived difference actions to a state that does not equal the original state from which the difference was computed. This is called fuzzy patching. However, fuzzy patching is error prone and may result in different object graph states for different users. Differential synchronization systems can fulfill requirement a and under some circumstances b, but not c, d, e, f and g.

G. Operational Transformation

Operational Transformation (OT) is an extension of the System Prevalence pattern in which—in addition to maintaining the object graph—user actions get recorded into a log of operations. These operations can be transferred to other users, but are not directly applied to their object graph. They are first transformed against other operations to bring them into the correct context as the object graph of the receiving user might differ from the one in which the operations were originally recorded.

The challenge of implementing a working OT scheme lies in performing the following tasks:
  define a set of operations that can record all possible user actions and their undo inverse.
  define transformations between all possible operation pair combinations, which guarantee convergence and preserve the user intention as much as possible.
  define an integration algorithm that determines which transformations are to be applied to a given operation for bringing it into the desired operation context. The algorithm also needs to guarantee that custom validation requirements of the individual model logic do not get violated.

OT was originally developed for collaborative real-time plain-text editors but has since been applied to various other applications.

OT solutions can fulfill requirements a, b, and c, but the existing schemes make it very hard to implement operations that guarantee a correct undo behavior (requirement d). Additionally, there does not appear to be any existing OT scheme that can successfully be applied to object graphs of applications in the way described in the introduction and which fulfills requirements a, b, c, and d.

Several methods are known for syncing data structures that aim at supporting the collaborative work of several users or participants.

U.S. Pat. No. 8,527,440 B2 discloses a system for performing consistency maintenance of distributed graph structures that compares changes to identify conflicting operations. Changes made by a user to a local model are expressed through primitive operations, wherein operational transformations can be employed specifying how one primitive operation is transformed against another primitive operation.

The article "Undo as Concurrent Inverse in Group Editors" by Chengzheng Sun, published in ACM Transactions on Computer-Human Interaction, Vol. 9, No. 4, December 2002, Pages 309-361, proposes an undo solution for collaborative applications which consists of a generic transformation control algorithm that is capable of generating, transforming, and representing valid inverse operations in any context and a set of transformation functions that are capable of preserving undo-related transformation conditions and properties. Operations transformations build the foundation of this undo solution. The disclosed algorithm is named "AnyUndo".

BRIEF SUMMARY OF THE INVENTION

The object of the present invention is to provide a method and a system for syncing data structures which, by employing the concept of operational transformation, is applicable to data structures represented as object graphs and provides the means to implement nonlinear undo behavior and simultaneously allows unblocked and offline collaboration and consistent merge and intention preservation.

This object is achieved by a computer-implemented method for maintaining consistency of a data structure, the method comprising the steps of:
  retrieving, at a computing device, a data structure which is built as an object graph comprising a plurality of objects;
  receiving, at a computing device, first user input indicating a first set of changes on the object graph, wherein the changes comprise atomic operations acting on the object graph;
  receiving, at a computing device, second user input indicating a second set of changes on the object graph, wherein the changes comprise atomic operations acting on the object graph;
  accessing operational transformations, each transformation specifying how one atomic operation is transformed against another atomic operation;
  modifying the object graph to encompass the first and second set of changes by employing the operational transformations on the atomic operations and applying the resulting transformed operations to the object graph;

storing the modified object graph in computer-readable memory;

characterized in that the objects of the object graph comprise an identifier and at least one property, respectively;

the transformed operations are recorded in a history log, wherein the history log comprises the atomic operations which are grouped in regular events, wherein a regular event comprises one or more atomic operations, wherein to each regular event an execution state is assigned which can either be "executed" or "unexecuted", and wherein a regular event with execution state "unexecuted" is kept in the history log and its effect on the object graph is removed;

wherein the atomic operations comprise object operations that create or delete an object of the object graph;

property operations that change a property of an object of the object graph;

and wherein each of the operations retains the identifier of the object it acts on and information on each change of the object resulting from the operation and wherein when a transformation of two of the operations results in a conflict, a conflict event is created and added to the history log, wherein the conflict is resolved by changing the execution state of the event which comprises one of the operations resulting in a conflict and redoing the transformation, and wherein the conflict event records the changing of the execution state of this event and which events in which execution state are in conflict;

when a transformation of two operations, wherein one of the two operations is transformed against the other of the two operations, results in a tie, one of the two operations is assigned winning the tie by applying a tiebreak criterion, wherein if the transformed operation is losing the tie, it is marked as suppressed by the other operation, and wherein if the transformed operation is winning the tie, it is marked as overwriting the other operation, and wherein the transformed operation retains being suppressed by or overwriting the other operation.

Preferred embodiments of the invention are described in relation to the dependent claims and the description in relation to the enclosed drawings.

The present invention is based on the consideration that, as software applications, software design and data representation of such applications become increasingly complex and collaborative work becomes more common and important, a correctly working undo mechanism is of paramount importance. If undo functionality is not at all or not reliably implemented, additional work is needed to obtain, restore or repair the collaboratively worked on data structure, which leads to a loss of resources such as time, costs, manpower etc. Furthermore, it is often advantageous or desirable to represent data of an application as an object graph, which allows powerful, versatile and flexible representation of data and their relationships.

Applicant has recognized that the concept of OT can be advantageously adapted to the collaborative manipulation of data represented as an object graph by employing suitable atomic operations and by keeping and recording all information regarding changes made to these data. This way, during all manipulations of this data structure in a collaborative manner, no loss of information occurs. Such a scheme then can provide fully-fledged nonlinear undo functionality for manipulations on the object graph which occur in a collaborative manner by a plurality of users, which means that any operation performed by a user can be undone or redone at any time during the collaborative work. This means that after an arbitrary event has been undone, the object graph will be in the same state as if the event had never happened.

In order to keep all necessary information to undo or redo operations or events at any time, the changes made to objects by the operations can for example be taken care of by retaining or keeping the respective old and new values. Alternatively, the old or new value and the necessary change to obtain the new or old value can be kept.

A conflict between two operations denotes the situation that the concurrent application of both operations would lead to an object graph in an inadmissible state. Examples for inadmissible states are:

non-respecting of object ownership: if an object is deleted, any objects owned by it have to be deleted, too. If this is not the case, the object graph assumes an inadmissible state object trees, that is trees built by objects of the object graph are kept cycle-free; if cycles occur, the object graph is in an inadmissible state.

The demand that the object graph always stays or remains in an admissible state poses constraints on its manipulations, especially the atomic operations and their transformations.

To preserve the basic object graph constraints mentioned above, some atomic operations simply cannot be merged while allowing both to change the graph. As an example, one can assume a tree structure with root R and leafs A and B. A first user Alice moves A under B (that is, B becomes parent of A), a second user Bob concurrently moves B under A (that is, A becomes parent of B). When naïvely combined, the parent of A would be set to B and the parent of B to A, forming a loop and disconnecting both from the root object. Simply removing one of the operations during transformation would solve this problem, but it would violate the undo requirement: if the event containing the other operation were undone, the removed operation would have to take effect again.

The solution according to the present invention is the introduction of conflict events. Contrary to regular events, these events do not contain operations, but describe the executed state of two or more events that create a conflict (it is possible that a conflict arises only if a certain event is not executed). To resolve the conflict, the execution state of one of the conflicting events is changed. The conflict event records which event is in a so-called "forced" state, wherein being in a forced state means that its execution state was changed. When a conflict is discovered during integration, a conflict event is created and inserted somewhere between the conflicting events. Each event carries a list of conflict events it takes part in, which is updated accordingly.

Although conflicts are produced by operations, conflict resolution is done at the event level because events are the smallest undoable unit.

According to the present invention, the atomic operations are applied to the objects of the object graph, with each object being addressed by a unique object identifier. This is in stark contrast to the addressing in a typical text-oriented OT, which uses an index into a single text string. Index-based addressing leads to the hard-to-solve false-tie problem.

Preferably the operations comprising one user action are grouped in an event. Preferably, multiple operations in one event are assigned an index, which is used as order criterion and to address single operations within an event. Preferably, events comprise or are assigned to a timestamp which is preferably used as a tiebreak criterion and ensures convergence. The execution state that is assigned to or associated with the respective event can be part of that event, i.e. the event comprises the execution state as a data component.

The history log is a data structure which records the operations, events (regular, conflict, reversion) and commits as described above and can be realized as one or several persistable data structures.

Objects in the object graph are preferably tuples of properties, with each object having a unique identifier. Properties are preferably identified by keys (typically strings). A property is either an attribute with an, for instance, atomic and serializable value or a relationship to another object in the graph. Objects have preferably an underlying data model, most preferably a class structure.

The atomic operations are designed to capture the changes of the object graph and are transformable against each other according to OT requirements. The operations contain preferably several values.

According to the present invention, the following operations are used:
Object Operation: create or delete the target object. Values are Booleans reflecting the existence of the object. That is, a create-operation has oldValue=false and newValue=true, a delete-operation vice versa. Object operations carry a snapshot of the object state (in the form of a dictionary of key/value pairs of the properties of the object).
Property Operation: change the value of an attribute of the target object from oldValue to newValue.

A snapshot of an object comprises the current values of its properties, especially attributes and relations. It thus can preferably be cast in a collection of key-value pairs.

The operations carry old values in addition to new values to be invertible: Each operation can create an inverse operation, which undoes the effect of the original operation. The snapshot of object operations serves the same purpose.

Two operations can result in a tie, wherein one operation loses and the other one wins the tie. The criterion or tiebreak criterion for which operation wins the tie is arbitrary. It only needs to result in the same winning operation on every site. To this end, the tiebreak criterion is to be chosen to obtain convergence, meaning that the order in which the two operations are integrated must not matter. This means that if O1 and O2 are two operations which form a tie and are transformed against each other, the same operation must win regardless of the transformation order. Thus, if O1 is transformed against O2, the result must be the same as if O2 is transformed against O1. The same tiebreak criterion must be chosen for all users concurrently working on the data structure and must be the same for all computing devices involved.

Accessing operational transformations comprises the case where these transformations are realized in computer code and are applied for transforming atomic operations against each other. It also comprises the case where these transformations are realized in a data structure. Also combinations of both cases are included.

The computing devices for retrieving an object graph and receiving first and second user input are preferably the same computing device; on this computing device, preferably the described method steps are performed. Alternatively, separate devices, which can communicate via a data connection, especially for transmitting or receiving user input, can be employed.

Changing the execution state of a regular event is also called reverting this event.

Advantageously, the operations comprise identifier operations that change an identifier of an object of the object graph, wherein
  object operations retain a snapshot of the created or deleted object;
  identifier operations retain the old identifier value and the new identifier value;
  property operations retain the old property value and the new property value.

This way, the changes made on each object involved in the operation are retained, allowing at any later time to undo the corresponding operation. All operations contain the identifier of the object they are targeting, and one old value and one corresponding new value. Operations with identical old and new value are no-ops. Such operations are never created by recording, but can be the result of a transformation. Possible value types depend on the kind of operation.

Identifier Operations change the identifier of the target object to newValue. The old value always equals the target object ID.

A snapshot of an object comprises the current values of its properties, especially attributes and relations. It thus can preferably be cast in a collection of key-value pairs.

Preferably the property is either an attribute containing a serializable value or a relationship to another object in the object graph, and wherein the property operations comprise:
  attribute operations that change the attribute of an object from an old value to a new value;
  relationship operations that change the relationship of an object with respect to other objects.

With other words, an attribute operation changes the value of an attribute of the target object from old Value to newValue. A key string preferably identifies the attribute. Values can be any value that can be used as an attribute value in the object graph. Such values must be copyable and serializable in the history log. A relationship operation is a subclass of the attribute operation for changing relationships. The values are the identifiers of the related object.

Relationships are preferably bidirectional: for a relationship k on object A pointing to B, there is preferably be a relationship k' on B pointing to A. k' is called the inverse key of k, it then must be available when relationship changes are recorded. Relationships can be one-to-one, one-to-many or many-to-many. To-many relationships are unordered, that is the value of such a relationship is a set of object references.

Relationships are further distinguished in owning and not owning. Owning relationships, i.e. object a owns object b, delete their related objects when the object holding the relationship is deleted. The inverse of an owning relationship is preferably a to-one relationship.

When a relationship is established, both involved objects are changed because both directions are set. Only one of these changes is recorded as operation, the inverse is implicit. For one-to-many relationships the to-one side is recorded, for owning relationships the non-owning side (note that this is never to-many by the restriction above). For other one-to-one relationships the recording side is arbitrary but must be selected in a reproducible way.

Many-to-many relationships are not recorded as relationship operations but as object operations for a conceptual join object. These join objects are never really created; performing the object operation simply recreates the relationship between the two objects.

In a preferred embodiment, when a first and a second operation are transformed against each other, when the first operation is an object operation and the second operation is any of the operations, the first operation is transformed to provide an updated snapshot according to the second operation, and the second operation is transformed to hold information on its new existence state according to the first operation;

when the first operation is an object operation deleting a first object and the second operation is a relationship operation removing ownership of a second object from the first object, a conflict event is created and the second operation is reverted;

when the first operation is an object operation deleting a first object and the second operation is a relationship operation moving ownership of a second object into the first object, a conflict event is created and the second operation is reverted;

when the first operation is an object operation on a target object of which the snapshot comprises a relation to a related object, and wherein the second operation is a relationship operation acting on the related object which changes the relation to the target object to another object, wherein the related object does not own the target object, from the snapshot of the first operation the relationship to the related object is removed, and in the second operation the new existence state of the target object is recorded;

when the first operation is an object operation acting on a target object and the second operation is a relationship operation acting on related object which changes the relation of the target object from a third object to the target object, the relation is entered into the snapshot of the first operation, and in the second operation the new existence state of the target object is recorded;

when the first operation is an object operation creating a target object which carriers a relation to a related object in its snapshot and the second operation is a relationship operation acting on the related object and creating a relationship of the related object to a third object in the snapshot of the first operation the relationship to the second object is removed, and in the second operation, the change of relationship from the target object to the third object is entered;

when the first operation is an object operation deleting a target object and the second operation is an object operation creating a join object which involves the first object, a conflict event is created and the second operation is reverted;

when the first operation is an object operation acting on a target object which carriers a relation to a related object in its snapshot, and wherein the second operation is an object operation deleting the related object, the relationship to the related object is removed from the snapshot of the first operation, and the second operation remains unchanged;

when the first operation is an object operation acting on a target object and the second operation is an object operation creating a related object with a relationship to the target in its snapshot, in the snapshot of the first operation this relationship is entered and the second operation remains unchanged;

when the first operation is an identifier operation changing the identifier of a target object from an old value to a new value and the second operation is any of the operations containing the old value of the identifier of the target object as an identifier, as an attribute, or in the snapshot, the first operation remains unchanged and in the second operation, the old value is changed to the new value;

when the first operation is an identifier operation changing the identifier of a target object from an old value to a new value and the second operation is an object operation creating an object identified by the new value, a conflict event is created and the first operation is reverted;

when the first operation is an identifier operation changing the identifier from an old value to a new value and the second operation is an identifier operation changing the value of the identifier of another object to the new value, one of the operations is reverted by applying a tiebreak criterion.

Join objects are objects whose purpose it is to create a connection between two other objects.

Preferably, for reverting a regular event in the history log, for the operations that belong to the regular event, inverse operations are created in reversed order, wherein the inverse operations are transformed against all operations in the history log from this point on, and wherein the operations in the history log are transformed against the inverse operations, and wherein the resulting inverse operations are executed on the object graph and then discarded, and wherein the reverted regular event is marked as unexecuted and is kept in the history log at its original position, and wherein if the regular event takes part in one or more conflict events, for each such conflict event, if the execution state of the regular event is forced by the conflict event, or if the conflict event is not currently forcing any execution state, but the execution states of the conflicting events would be in conflict after the reversion of the regular event, the execution state of another regular event in the conflict event selected by a tiebreak criterion is forced before the regular event is reverted, and if the execution state of another regular event in the conflict event is forced, that event's execution state is reverted after the regular event is reverted.

Preferably, if a regular event is reverted that takes part in one or more conflict events, the state of each of these conflict events is updated as follows:

if the conflict event forces the execution state of the original regular event to revert, another regular event in this conflict is selected by a tiebreak criterion and is forced (that is, its execution state is reverted) before the original regular event is reverted;

if the conflict event is not currently forcing any execution state, but the execution states of the conflicting events would be in conflict after the reversion of the original regular event, another regular event in this conflict is selected by a tiebreak criterion and is forced before the original regular event is reverted;

if the conflict event forces another regular event, the execution state of that regular event is changed after the original regular event has been reverted and the conflict event is marked as not forcing any event.

These checks and actions are applied recursively for any regular event being whose execution state is reverted in the process.

Preferably, regular events retain a list of references to conflict events which they are part of and thereby enable the checks described above to be fast.

Regular events constitute the units for reversion; single operations in the history can't be reverted, with the exception that a regular event only contains one operation. Regular events can be in two states: executed or unexecuted. In the latter state, the regular event remains in the history log, but its effect is removed from both the later part of the history and the object graph. This is an example for the underlying principle of the invention that information on manipulations on the object graph is not permitted to get lost.

The advantage of the described scheme compared to e.g. the above cited AnyUndo algorithm is that inverse operations are never transformed against other inverse operations. Doing the latter would be a hard and very complex problem. Applicant is not aware of any operation/transformation sets that would work correctly with the integration algorithm of AnyUndo. Furthermore, what is needed is the removal of the effect of an unexecuted event from the history log for the conflict event scheme described below.

A disadvantage of the described scheme is the lost immutability of the history log: when an event is undone, the complete history log beginning with this event is transformed and thereby permanently changed. This needs careful consideration when working with branches as described below.

The business logic typically places many constraints on the object graph, such as count restrictions of to-many relationships or certain correlations between attribute values. Syncing between object graphs, which are individually valid before the syncing, can violate almost any such constraint that spans more than a single attribute. Most such violations must be solved by the business logic.

Preferably object ownership is respected: if an object is deleted, any objects owned by it have to be deleted, too. Whether a relationship between objects is owning is preferably defined in the data model which is underlying the objects of the object graph. The data model also preferably defines classes and properties of the objects.

Preferably, only one version or copy of the object graph is manipulated or kept in memory, wherein the history log is used to shift the state of the object graph between different branches as requested by the user.

The history of operations in the history log is not immutable. If the execution state of events is changed for undo/redo or to resolve conflicts, all operations following the changed event are transformed against the resulting inverse operations and persisted in the new state. This poses a problem for user branches (see below). A user branch diverges from the master branch at its split point. If commits before the split point need to be accessed (e.g. for undo, audit trail or integration), these commits are taken from the master branch. But since the user branch diverged from the master branch, events in the master branch may have changed their execution state (e.g. because another user branch was integrated into the master branch).

Therefore the master branch must be brought back into the state it was in when the user branch diverged before any commits from it can be used in the context of the user branch. This is the reason to have reversion events. Any reversion events on the master branch after the split point, which revert regular events before the split point, must be undone to prepare the master branch for use by the user branch. Conflict events are considered in a similar fashion.

Of course the persisted state of the master branch must not be changed by this preparation. Instead, runtime-only copies of the events that need to be modified are created and are used in the context of the user branch. This scheme allows preparing of the master branch for several user branches with different split points at once.

The full history log consists of a master branch and any number of user branches.

The relationship operations preferably comprise tree operations that retain as old and new values complete ancestor chains of the direct parent of an object to the root of an object tree built through one-to-many relationships between objects of the object graph.

With other words: tree operations build a subclass of the relationship operations for the parent relationship in object trees. Values are the complete ancestor chains from the direct parent to the root of the tree.

A cycle can be created for instance if relationship operations between two objects have a reflexive nature, for instance for objects a and b, a can be a child of parent b, and b can be a child of parent a. Cycles can have arbitrary length. A cycle exists if, starting from an object following its relationships (without their respective inverse), that same object can be reached again.

A tree as part of the object graph is formed by a one-to-many relationship between objects of the same class. The to-many relationship is hereafter called "children", the to-one inverse relationship "parent". The term "tree" implies that cycles are not allowed. But cycles could easily result from combining operations which are all legal by themselves. Detecting a cycle when transforming one operation against another is non-trivial because a cycle can be formed by the combination of more than two operations.

A special tree operation (subclass of the relationship operation) is used for parent/children relationships to detect cycles during transformation. As usual, the to-one side of the bidirectional relationship is recorded (the "parent" in this case). Tree operations record the whole ancestor chain up to the root for both the old and new value, expressed as arrays of object identifiers.

Advantageously a the tree operation that would create a cycle when applied to the object graph is detected during transformation against another tree operation for the same object tree by applying the other tree operation on the new ancestor chain value of this tree operation and checking whether the identifier of the object the tree operation being transformed is applied to occurs in the transformed ancestor chain.

When a tree operation $O_1$ is transformed against another tree operation $O_2$ with the same key but different target object ID, the ancestor chains of $O_1$ are searched for the target object ID of $O_2$. If the ID is found, the part of the ancestor beyond this point is replaced by the new value of $O_2$. If the resulting new ancestor chain contains the target object ID of $O_1$, a cycle has been formed.

To avoid the cycle, a conflict event is created and the event of one of the offending operations is reverted. To ensure convergence, the same event needs to be reverted regardless of transformation order. That is, any operation contributing to the cycle must be known when the cycle is detected. To achieve this, the inverse $\bar{0}_2$ of $O_2$ is created and attached to $O^{1'}$ whenever one of the ancestor chains of $O^{1'}$ is affected by the transformation. $\bar{0}_2$ is defined on the same context as $O_1'$ and can thus be transformed together with $O_1'$ during later transformations.

When a cycle is detected, the ancestor chain with the cycle is tentatively transformed against all inverse operations attached to $O_1'$ in turn. If the cycle goes away by such a transformation, the original of the inverse operation contributes to the cycle. Additionally, $O_1$ is known to contribute to the cycle. The resulting list of operations is sorted by using tiebreak criterions; commit IDs and event indices ensuring identical order no matter which transformation discovers the cycle.

Preferably the described tree operations retain the inverse operation of every tree operation for the same object tree they are transformed against, and wherein after a potential cycle has been detected, a list of operations contributing to the cycle is built from the tree operation being transformed plus any retained inverse operations which remove the cycle when applied to the transformed new ancestor chain value, and wherein a conflict event is created and recorded in the history log and wherein the event of which the execution state is changed for conflict resolution is selected from the list using a tiebreak criterion.

Advantageously, for undoing an event in the history log, the event is unexecuted and a reversion event referencing the event is created and appended to the history log, and wherein for redoing the event, it is executed again and another reversion event for the redoing of the event is appended to the history log.

Reversion events comprise a unique reference to a regular event and information if they correspond to an undo or a redo operation. They need to be considered by an integration algorithm much in the same way as regular events which comprise operations. During integration the integration algorithm is run twice: first for reversion events, then for regular events. Reversion events are transformed against each other just like the operations of regular events, albeit with a much simpler transformation matrix. The only interesting transformation is that of two identical reversion events, which results in marking one of them as a duplicate.

After reversion events have been integrated, the result is applied to both histories/branches to bring them into the same state concerning the execution state of events shared by both histories/branches. This uses runtime-only copies of events similar to the scheme described below.

As an optimization, paired reversion events can be removed from the open commit before it is closed.

One or more events in the history log preferably build a commit to which a universally unique identifier is assigned. Other choices are possible, as long as commit IDs are unique among commits of all users.

A commit is preferably the smallest unit for persisting: a commit is closed each time a save action is triggered; either by the user or via an auto-save functionality.

A commit ID can be used as a primary or, preferred, secondary tiebreak criterion. If they are used a secondary tiebreak criterion, they can be used to decide a tie if the primary criterion, for instance, the time stamp, is identical, which is, of course, rarely the case in real-world applications.

Commits are preferably organized in branches, with one master branch that starts from an empty object graph, and any number of user branches that diverge from the master branch at a split point. Only full commits are ever considered for integrating into other branches or histories.

The reference or pointer of a reversion event to a regular event advantageously comprises the commit ID of the commit of the regular event it is pointing to as well as an index of this regular event within its commit.

Preferably the respective commit is identical to an event.

For integrating new commits from a first history log into a second history log, wherein both the history logs have a common origin and the first history log is called source log and the second is called target log, the preferably the following steps are performed:

determining the most recent point with a common operation context shared by both history logs for both history logs building an integration node for each commit after the recent common point, wherein the integration node contains copies of the events of this commit;

identifying each integration node with a node identifier which is unique during the integration procedure, wherein integration nodes for commits with the same identifier get the same node identifier;

assigning to each integration node a relative operation context, which consists of the set of node identifiers of all integration nodes for commits which are less recent in the history than the commit of the integration node;

transforming integration nodes with identical relative context against each other by, in a transforming step, transforming each operation of each event of the first integration node against each operation of each event of the second integration node in their original order, wherein the resulting operations from each transformation are used for the next transforming step, and creating two new integration nodes which contain the transformed operations and have the identifier of the respective other node in their relative operation context;

building a two-level lookup structure for these integration nodes, of which a first key is the node identifier and a second key is a relative context;

recursively transforming an integration node to a given relative context by employing the lookup structure;

determining as a target relative context the set of node identifiers created from the target history log;

iterating over the integration nodes created from the source history log, wherein any integration node which is already present in the target history log is skipped, and transforming each of the integration nodes into the target context employing the recursive algorithm, wherein after each step, the identifier of the transformed node is added to the target context;

creating new commit objects in the target history log from the transformed nodes, using the commit identifiers of the original commits in the source history and adding the events with the transformed operations from the transformed nodes to the new commits;

applying the operations of the new commits on the object graph.

Preferably all integration nodes and the lookup structure are discarded after the described method steps have been performed. They only serve to temporarily contain information need during the integration procedure and can thus be disposed.

The method for building a common history as described above is commonly denoted as integration algorithm. The integration algorithm in an OT system is responsible for transforming concurrent operations against each other in such a way that they can be integrated into a common history. This is non-trivial because operations can be transformed against each other only if they are defined on the same operation context, which means they have the same set of previous operations. Transformations must therefore be done in a carefully planned order to conform to this restriction and result in a list of operations building on each other.

In many OT systems known from the art a so-called vector clock drive the integration algorithm. In the simplest case this is a pair of indices attached to operations that are to be synced, which effectively describe the context of the operation. While simple and efficient, vector clocks do not support arbitrary integrations between branches.

The integration algorithm presented here accepts two branches, which belong to history logs with a common origin and integrates all commits which are new in one branch (the source branch) into the other (target) branch (also called merging). It uses a recursive sub algorithm to create a working transformation order.

Two operations have the same operation context or context if the sets of previous operations, i.e. the operations previously recorded in the history, are identical.

As specified above, a recursive algorithm is used to transform a node to a given context. If the integration node does not yet exist with the requested relative context, the algorithm uses the lookup structure to find the integration node with the given node identifier and a relative context that is a subset of the requested relative context with the fewest missing node identifiers. Then it tries to recursively get any of the missing nodes in the correct relative context to transform against. As long as any transformation can be performed, the algorithm repeats until it either created the desired node or returns failure.

While the recursive node transformation algorithm can fail on deeper levels depending on ordering, it does always succeed at the top level due to the structure of histories and integration nodes.

The runtime complexity of integrations scales at least with the product of the operation counts on both sides of the integration. The recursive integration node algorithm adds on top of this by transforming some nodes more than once. Two observations can help to minimize the runtime complexity of integrations:

The commit history digest supports efficient lookup of the most recent common point. Up to this point, both histories/branches consist of the same set of commits (regardless of their order).

Individual integration nodes can contain the events of more than one commit as long as these commits are not ordered differently in the two histories/branches. If the histories/branches are completely disjoint after the integration start point, this results in just one integration node each for source and target and a trivial case for the recursive algorithm.

The history log is preferably organized in branches which comprise different developments of the history of the object graph, wherein each branch is a list of commits, and wherein the history log starts with a master branch, and wherein other branches start at split points from existing branches.

The integration algorithm described above is advantageously applied to branches of the same history log or to branches of different history logs.

The history log is preferably kept indefinitely, that is, operations are not deleted and no information gets lost. It is advantageously only pruned on user request.

The respective object identifier is preferably a universally unique identifier (UUID). This guarantees that objects created concurrently have separate identities. Operations on them do not need to be transformed against each other.

An object that joins at least two other objects is preferably assigned a dependent object identifier that is built of the object identifiers of the joined objects.

In some cases though it is not tolerable that concurrent object creation leads to different object identities. One example is join objects: objects whose purpose it is to create a connection between two other objects. If join objects between the same pair of objects are created concurrently, there must be only one join object after syncing the changes together. This is solved by the use of dependent object identifier or dependent IDs: object identifiers that depend on one or several other object IDs.

The dependent object identifier is advantageously built by concatenating the object identifiers of the joined objects.

In the case of the join objects, concatenating the IDs of the joined objects creates the ID of the join object. Dependent IDs are not restricted to join objects; they can be used whenever object identity is best described in relation to other objects.

In some cases the dependent ID of an object can change while the object exists: a join object can be moved from one object pair to another one while any additional properties of the object are preserved. The presented solution supports this with the help of an extra operation type for object ID changes.

The respective event is preferably identical to an atomic operation. This means that whenever such an event is assigned an execution state, this execution state is assigned to the atomic operation itself and similarly for other assignments. Since in this case an event is identical to an atomic operation, the event comprises no informational or other overhead over the atomic operation. In a preferred embodiment, all events are single atomic operations in this sense.

The invention also relates to a non-transitory computer-readable storage device, coupled a computer and having instructions stored thereon which, when executed by said computer, enable and/or cause the one or more processors to perform operations for maintaining consistency of a data structure, the operations comprising a method described above.

The invention also relates to computer-readable storage medium containing instructions which, when loaded into memory of and executed on a computer, enable and/or cause the computer to perform operations for maintaining consistency of a data structure, the operations comprising a method described above.

The invention also relates to a computer program product, which is stored on a non-transitory computer-readable medium and can be loaded directly into memory of a computer, comprises software code sections which when executed on the computer enables the computer to perform a method described above.

The invention also relates to a system, comprising:
at least one computing device;
a non-transitory computer-readable storage device, coupled to the computing device and having instructions stored thereon which, when executed by the computer, enable and/or cause the one or more processors to perform operations for maintaining consistency of a data structure, the operations comprising a method described above.

The invention also relates to a computer comprising memory having stored thereon software code sections which when executed on the computer enable and/or cause the computer to perform a method described above.

The invention also relates to a collaborative system, comprising at least two computers as described above.

The advantages of the invention are especially as follows. By employing the described type of operations which keep all changes they make on the objects, recording the transformed operations in a history log and handling conflicts and ties in the described manner, users can collaboratively work both online and offline on an object graph and merge their respective changes without the need for user interaction to resolve conflicts. Full undo support for the changes of the current user is provided even if changes from other users are integrated in between: those changes can persist, while older changes of the current user are undone using the non-linear undo facility.

The employment of a history log allows to support an audit trail (requirement g). The use of operational transformations supports requirements a (unblocked collaboration), b (consistent merge and intention preservation) and c (offline collaboration).

Since arbitrary user actions can be un-executed and re-executed anywhere in the history of operations, non-linear undo is enabled (requirement d).

The support of branching in the history or operation log, which means that independent lists of operations can diverge from the main history and be integrated (merged) back into it at a later time, allows to enable requirements e (auto save) and f (publishing independent from saving).

The presented atomic operations can capture the changes of an object graph and are transformable against each other according to the OT requirements. The presented integration algorithm supports integrations of arbitrary history branches and un-executing arbitrary user actions (=regular events) anywhere in the log.

By employing operational transformations, unblocked collaboration (requirement a), consistent merge and intention preservation (requirement b) and offline collaboration (requirement c) are supported.

The described OT scheme allows the un-executing and re-executing of arbitrary user actions anywhere in the history of operations, which are recorded in the history log, allows the realization of a nonlinear undo-functionality.

The cycle avoidance scheme employing tree operations guarantees a critical invariant of many data models while ensuring convergence and full undoability of any event.

The employment of tree operations during the transformation of operations allows already at the earliest stage to detect the possible creation of cycles in the object graph and allows taking measures to avoid them in the first place.

The invention is especially suited for, but not limited to, applications which are implemented using object-oriented programming languages such as Objective-C, C++, Java, and Python.

Other features which are considered as characteristic for the invention are set forth in the appended claims.

Although the invention is illustrated and described herein as embodied in a method and system for syncing data structures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Further characteristics and advantages of the present invention will be highlighted in greater detail in the following detailed description of some of its preferred embodiments, provided with reference to the enclosed drawings. In the drawings.

DETAILED DESCRIPTION OF THE INVENTION

Figure 1:
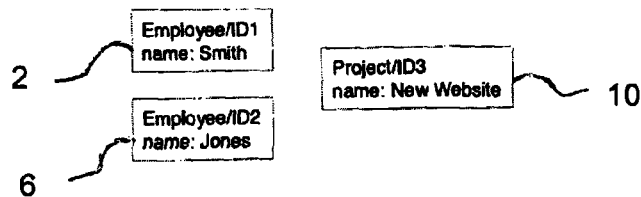
FIG. 1 a diagram of an initial state of an object graph which is collaboratively worked on by two users, Alice and Bob.

Referring to FIGS. 1 to 12, a preferred embodiment of the method according to the invention is discussed.

Two users, Alice and Bob, work collaboratively on a data structure which is represented as an object graph and which represents project management data of a company with several employees. Alice and Bob concurrently work on the object graph at their respective device, which can, for instance, be a personal computer, a tablet, or a smartphone. Alice and Bob respectively hold a local copy or representation of the object graph in the memory of their respective device. The changes or modifications on the object graph which Alice performs are transmitted to Bob via email. Similarly, changes or modifications which Bob performs are transmitted to Alice.

The object graph comprises and/or can be built of objects which have an object identifier and at least one property. They are designed according to a data model. Properties can be attributes or relationships.

In the example shown, identifiers of objects or object identifiers and identifiers of operations are represented by integer numbers. In a real world scenario, these identifiers are built using universally unique identifiers to ensure uniqueness across different users.

Alice and Bob have installed on their respective computing device computer programs with software code sections which cause their respective device to perform instructions according to the preferred embodiment of the method according to the present invention described here. The user input of Alice and Bob respectively contain changes which respectively comprise atomic operations acting on the object graph, wherein the operations which are described below are employed.

In the example discussed here, each atomic operation of a user is identical to an event. Each event is identical to a commit, which is the smallest unit that can be integrated into a history log.

The following types of atomic operations are employed:

Object Operation: create or delete the target object. Values are Booleans reflecting the existence of the object. That is, a create-operation has oldValue=false and newValue=true, a delete-operation vice versa. Object operations carry a snapshot of the object state (in the form of a list of key/value pairs of the properties of the object).

Identifier Operation: change the identifier of the target object to newValue. The old value is always the target object ID.

Attribute Operation: change the value of an attribute of the target object from oldValue to newValue. A key string identifies the attribute. Values can be any value that can be used as an attribute value in the object graph. Such values must be copyable and serializable in the history log.

Relationship Operation: a subclass of the attribute operation for changing relationships. The values are the identifiers of the related object.

Tree Operation: a subclass of the relationship operation for the parent relationship in object trees. Values are the complete ancestor chains from the direct parent to the root of the tree.

The operations carry old values in addition to new values to be invertible: Each operation can create an inverse operation, which undoes the effect of the original operation. The snapshot of object operations serves the same purpose. This way, no information is lost when operations are applied to objects of the object graph. The previous state of any object can be restored since all changes or retained.

The operations of Alice and Bob are transformed against each other in such a way that they can be integrated into a common history, wherein when being transformed they have to have the same operation context, i.e. the same set of previous operations.

Operations are transformed against each other by operational transformations. Transformation of operation $O_1$ against operation $O_2$ results in operation $O_1'$ which includes $O_2$ in its context. That is, $O_1'$ is defined on an object graph with $O_2$ applied. Transformation results fall in four categories:

A. No change, that is $O_1'=O_1$: this is the case if $O_1$ and $O_2$ address different objects or different attributes of the same object and neither affects a relationship between these objects. The vast majority of actual transformations are in this category.

B. $O_1'$ is a modified version of $O_1$: $O_1'$ still does mostly the same as $O_1$, but some parameter is modified by the transformation. An example is transforming against an identifier operation: if $O_1$ addresses the same object as $O_2$, the object ID of $O_1'$ is the value of $O_2$.

C. Transformation results in a conflict: If a constraint conflict is detected during transformation, the transformation fails, a conflict event is created, the conflict is resolved by changing the execution state of one event and then the transformation is redone. Operations of unexecuted events are (mostly) ignored during transformation; therefore the transformation will succeed now.

D. $O_1$ and $O_2$ form a tie: A prime example is two attribute operations with the same object ID and key, but different values.

Category B. and C. Transformations are preferably performed only if the event of $O_2$ is in executed state.

In the table given below the operation on the left side ($O_1$) is transformed against the operation on the right side ($O_2$) and vice versa. The transformed operations $O_1'$ and $O_2'$ are shown below their originals. An equal (=) sign in the second row denotes operations that are unchanged by the transformation. Operations have many parameters, for brevity only those of interest for the current transformation are included in the table.

The following table shows abbreviations for the various operations

| Operation Names in Transformation List | |
| --- | --- |
| Any Operation | Op |
| Object Operation | OOp |
| Identifier Operation | IOp |
| Attribute Operation | AOp |
| Relationship Operation | ROp |
| Tree Operation | TOp |

The following table shows operation parameters and values which are used in a transformation list given below. In this transformation list, only the parameters are shown which are necessary for the description of the functioning of the respective transformation.

| Operation Parameters and Values in Transformation List | | | |
| --- | --- | --- | --- |
| Parameter or Value | | Remark | Used by Operations |
| Object Identifier | oID | | All |
| Dependent Object Identifier | dOID<oID . . .> | 2 | All |
| Commit Identifier | cID | | |
| Event Identifier | eID | | |
| Operation Identifier | opID | | |
| Old Operation Value | oV | | All |
| New Operation Value | nV | | All |
| Object is gone (Boolean) | oig | 3 | All except OOp |
| Old object is gone (Boolean) | ooig | | ROp and TOp |
| New object is gone (Boolean) | noig | | ROp and TOp |
| Relationship is Owning | rio | 4 | ROp and TOp |
| Attribute Key | k | | AOp and sub classes |
| Inverse Relationship Key | i(k) | | |

-continued

Operation Parameters and Values in Transformation List

| Parameter or Value | Remark | Used by Operations |
|---|---|---|
| Old Object Existence | oE | OOp |
| New Object Existence | nE | OOp |
| Snapshot Dictionary | ss{key:value, . . .} [5] | OOp |
| true | T | |
| false | F | |

[2] A dependent ID depends on other object IDs. Only those of interest are listed.
[3] The "object is gone" flag is used by transformations against delete operations. If the flag is set, the target object of the operation does no longer exist and the operation is skipped when being applied on the state. Relationship operations have additional such flags for the old and new value object.
[4] Because recording is always done from the non-owning side, it is actually the inverse relationship that is owning.
[5] Only keys of interest are shown in the snapshots. Elements in a snapshot for to-many relationships contain sets of object IDs. Again only object IDs of interest are shown.

The following table shows transformations of categories 2 and 3 for a pair of operations which are transformed against each other Category 2 and 3 Transformations

| Operation 1 | Operation 2 | Category | |
|---|---|---|---|
| OOp(pID, oE, nE, ss{k: oV}) | Op(oID, i(k), oV, nV, oig) | 2 | Updating snapshot and "object is gone" flag |
| OOp(oID, oE, nE, ss{k: nV}) | Op(oID, i(k), oV, nV, !nE) | | |
| OOp(oID$_1$, T, F) Prevails | ROp(oID$_2$, rio = T, oID$_1$, oID$_3$) Reverted | 3 | Conflict: cannot move owned object out of concurrently deleted owner |
| OOp(oID$_1$, T, F) Prevails | ROp(pID$_2$, rio = T, oID$_3$, oID$_1$) Reverted | 3 | Conflict: cannot move owned object into concurrently deleted owner |
| OOp(oID$_1$, oE, nE, ss{k: oID$_2$}) | ROp(oID$_2$, i(k), rio = F, oID$_1$, oID$_3$, ooig) | 2 | Updating snapshot and "old object is gone" flag |
| OOp(oID$_1$, oE, nE, ss{ }) | ROp(oID$_2$, i(k), rio = F, oID$_1$, oID$_3$, !nE) | | |
| OOp(oID$_1$, oE, nE, ss{ }) | ROp(oID$_2$, i(k), rio = F, oID$_3$, oID$_i$, noig) | 2 | Updating snapshot and "new object is gone" flag |
| OOp(oID$_1$, oE, nE, ss{k: oID$_2$}) | ROp(pID$_2$, i(k), rio = F, oID$_3$, oID$_1$, !nE) | | |
| OOp(oID$_1$, F, T, ss{k: oID$_2$}) | ROp(oID$_2$, i(k), rio = F, NULL, oID$_3$) | 2 | Updating old value of ROp against snapshot |
| OOp(oID$_1$, F, T, ss{ }) | ROp(oID$_2$, i(k), rio = F, oID$_1$, oID$_3$) | | |
| OOp(oID$_1$, T, F) Prevails | OOp(dOID < oID$_1$ . . . >, F, T) Reverted | 3 | Conflict: cannot create join involving concurrently deleted object |
| OOp(oID$_1$, oE, nE, ss{k: oID$_2$}) OOp(oID$_1$, oE, nE, ss{ }) | OOp(oID$_2$, T, F) = | 2 | Updating snapshot against a delete |
| OOp(oID$_1$, oE, nE, ss{ }) OOp(oID$_1$, oE, nE, ss{k: OID$_2$}) | OOp(oID$_2$, F, T, ss{i(k): oID$_1$}) = | 2 | Updating snapshot against an insert |
| IOp(oID$_1$, oID$_2$) = | Op(. . . oID$_1$ . . .)[6] Op(. . . oID$_2$ . . .) | 2 | Object ID change |
| IOp(oID$_1$, oID$_2$) Reverted | OOp(oID$_2$, F, T) Prevails | 3 | Conflict: cannot change ID to a concurrently created ID. |
| IOp(oID$_1$, oID$_2$) | IOp(oID$_3$, oID$_2$) One is reverted by tiebreak criterion | 3 | Conflict: cannot change IDs of two distinct objects to same value. |
| TOp(oID$_1$, k, oV$_1$, nV$_1$) | TOp(oID$_2$, k, oV$_2$, nV$_2$) | 2/3 | Cycle Detection and Avoidance |

[6] Any operation containing oID$_1$ as target object ID, as one of the values, or in the snapshot.

If an operation prevails, it is meant that it has an effect on the object graph and gets assigned execution state "executed". If an operation is reverted, it is assigned execution state "unexecuted".

The transformed operations are recorded in a history log associated with Alice and a history log associated with Bob; their history logs are kept in memory and/or stored on their respective devices. The method for maintaining consistency of a data structure on their respective device is designed in such a way that the order of transformed operations in their respective history log can differ, but that the state of the object graph is identical for both users after applying the transformed operations to the object graph.

In the present embodiment of the method, mechanisms for cycle detection and avoidance are implemented. A tree as part of the object graph is formed by a one-to-many relationship between objects of the same class. For this discussion the to-many relationship is called "children", the to-one inverse relationship "parent". The term "tree" implies that cycles are not allowed. But cycles could easily result from combining operations, which are all legal by themselves. Detecting a cycle when transforming one operation against another is non-trivial because a cycle can be formed by the combination of more than two operations.

A special tree operation (subclass of the relationship operation) is used for parent/children relationships to detect cycles during transformation. As usual, the to-one side of the bidirectional relationship is recorded (the "parent" in this case). Tree operations record the whole ancestor chain for both the old and new value, expressed as arrays of object identifiers.

When a tree operation $O_1$ is transformed against another tree operation $O_2$ with the same key but different target object ID, the ancestor chains of $O_1$ are searched for the target object ID of $O_2$. If the ID is found, the part of the ancestor chain beyond this point is replaced by the new value of $O_2$. If the resulting new ancestor chain contains the target object ID of $O_1$, a cycle has been formed.

To avoid the cycle, a conflict event is created and the event of one of the offending operations is reverted. To ensure convergence, the same event needs to be reverted regardless of transformation order. That is, any operation contributing to the cycle must be known when the cycle is detected. To achieve this, the inverse $\bar{0}_2$ of $O_2$ is created and attached to $O_1'$ whenever one of the ancestor chains of $O_1$ is affected by the transformation. $\bar{0}_2$ is defined on the same context as $O_1'$ and can thus be transformed together with $O_1'$ during later transformations.

When a cycle is detected, the ancestor chain with the cycle is tentatively transformed against all inverse operations attached to $O_1'$ in turn. If the cycle goes away by such a transformation, the original of the inverse operation contributes to the cycle. Additionally, $O_1$ is known to contribute to the cycle. The resulting list of operations is sorted by using tiebreak criterions, commit IDs and event indices ensuring identical order no matter which transformation discovers the cycle.

A fourth kind of transformations are category 4 transformations. A tie occurs if two operations of the same type address the same object. In the case of attribute operations and their subclasses, they must additionally address the same attribute. In this case one of the two operations needs to win and the other one is suppressed. The tiebreak criterion must be chosen to ensure convergence; that is the same operation must win no matter on which device and in which order they are integrated.

The undo requirement complicates the handling of tiebreaks: if the event containing the operation that won the tiebreak is later unexecuted, the other operation must take effect again. For this reason, an operation losing a tiebreak cannot be removed from the history or be ignored forever. Instead, it remains in the history and is marked as being suppressed by the operation that won the tiebreak. Additionally, the old value of an operation losing a tiebreak during transformation is set to the new value of the operation that won the tiebreak.

When later the execution state of events is changed (for undo or conflict resolution), inverse operations are transformed against regular operations in the history. If a tie is found between an inverse operation $\bar{0}_1$ and a regular operation $O_2$, two cases need to be distinguished: $O_2$ and the original operation $0_1$ of $\bar{0}_1$ are concurrent or one depends on the other one. In the first case, $O_1$ and $O_2$ have been transformed against each other with tiebreaking, in the latter case not.

Because this knowledge is needed for the bookkeeping of suppressed operations, it must be captured when the original operations are transformed during an integration. The result of tiebreaking is recorded in the transformed operation in two sets of operation ids: one for operations, which won the tiebreak when transforming against them, the other for operations, which lost the tiebreak. The first is called sOpIDs (for suppressing operation IDs), the other oOpIDs (for overwritten operation IDs). These sets are updated during transformation regardless of the current execution and suppression state of the involved operations. Later transformations against inverse operations during event execution state changes do not change these sets.

A second pair of sets on each operation records the currently active suppressions (asOpIDs) and overwrites (aoOpIDs). Only operations in sOpIDs or oOpIDs respectively can be in these active sets. These sets are updated when transforming against both regular and inverse operations, but only if the operation transformed against is executed and not suppressed.

Another scenario which can occur is an inverse tie of relationship operations. Relationship operations for one-to-one operations can also tie on the inverse relationship. An inverse tie is detected when two relationship operations for the same relationship but different objects contain the same new value. That is, the inverse relationship is set to two different values on the object addressed by the new value (which is an object identifier for relationship operations).

Suppression of one of the tying operations works as above, but special action needs to be taken to ensure correct behavior if the suppressing operation is later unexecuted. Let $O_1$ and $O_2$ be two relationship operations with an inverse tie:

$O_1$=ROp ($oID_1$, k, NULL, $oID_3$)
$O_2$=ROp ($oID_2$, k, NULL, $oID_3$)

If $O_2$ is transformed against $O_1$ with $O_2$ winning the tiebreak, a new operation $O_3$ is inserted before $O_2$ and the transformation is restarted:

$O_3$=ROp ($oID_1$, k, NULL, NULL)

$O_3$ is originally a no-op and can therefore be inserted safely. When the transformation is retried, $O_3$ ties with $O_1$ in the regular way, resulting in the following transformed operations:

$O_3'$=ROp ($oID_1$, k, $oID_3$, NULL)
$O_2'$=ROp ($oID_2$, k, NULL, $oID_3$)

If $O_3'$ and $O_2'$ are later unexecuted, their inverses (executed in reverted order) correctly set the relationship back to $oID_1$<->$oID_3$. Care must be taken that the execution states of $O_3'$ and $O_2'$ are always kept in sync. Typically this is given because both operations belong to the same event.

Enforcing constraints in the OT algorithm is difficult and therefore done for the few basic constraints only which are described above. Any further constraints must either be relaxed or be repaired by the business logic after integrations.

The naïve approach to a user-arrangeable relationship is adding a sorting index to each object and updating these indices when the user changes the order. This approach would be susceptible to the false-tie problem; besides being inefficient due to the potential large number of index update operations for a single insert.

This is solved by making the order "index" a floating-point value, which allows insertions and order changes without renumbering all objects in most cases. Renumbering is never done after an object is removed from the relationships, thus avoiding the false-tie problem.

Collisions of identical order numbers after syncing are still possible, but these are real ties and are solved by a secondary sorting criterion (e.g. the object ID). If renumbering becomes necessary and happens concurrently, the result after syncing is not necessarily intention preserving. For typical uses of sorted relationships in business applications this is acceptable.

A state of an object graph which Alice and Bob manipulate concurrently shown in FIG. 1 contains three different objects 2, 6, 10. Object 2 is an object of class "Employee", with an attribute "name" which has the value "Smith" and an identifier with the value "ID1". Object 6 is another object of class "Employee" with identifier "ID2" and name "Jones". Object 10 is an object of class "Project" with identifier "ID3" and name "New Website".

Alice and Bob perform concurrent changes to this object graph. For making changes or modifications to this object graph, both users employ the above described atomic object operations.

Figure 2:
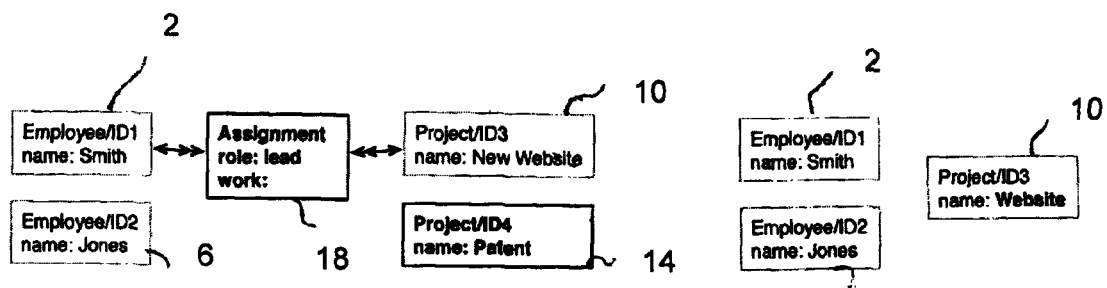
FIG. 2 two diagrams of the object graph with changes made by Alice (left side) and Bob (right side)

The operations of Alice are shown on the left side of FIG. 2. Alice inserts a new object 14 of class "Project" by an object operation for object class "Project". The existence of object 14 is changed from False or F to True or T which includes a snapshot with the current state of this newly created object. The operation is (with operation identifiers in the first column)

1: OOp(Project, ID4, F, T, {name:Patent})

Subsequently, Alice makes Employee Smith the lead for the website project. A resulting assignment object 18 is assigned a dependent identifier, which is built by concatenating the identifiers of objects 2 and 10, i.e. the identifiers ID1 and ID3 and denoted by a hyphen between these two IDs. This identifier implies the relationship of the assignment object to the employee object with identifier ID1 of and the project object with identifier ID3.

The corresponding operation reads

2: OOp(Assignment, ID1-ID3, F, T, {role:lead})

Concurrently, Bob changes the name of the project which is represented by object 10 by an attribute operation which records the identifier of the target object 10, the property name and the old and new values of the property. The operation reads 3: AOp(ID3, name, New Website, Website)

The object graph with Bob's changes is shown in FIG. 2 on the right side.

The operations of Alice and Bob at each site are integrated by the preferred embodiment of the computer-implemented method in order to obtain a new state of the object graph which incorporates all changes made by both users. The operations performed by Alice and Bob are transformed against each other, yielding new transformed operations. Since in the present case up to this point the operations of Alice and Bob do not influence each other, transforming them against each other does not change any operation (Transformation category 1).

The operations of Alice and Bob are recorded in the history log at Alice's site. Her history log reads:

1: OOp(Project, ID4, F, T, {name:Patent})
   2: OOp(Assignment, ID1-ID3, F, T, {role:lead})
   3: AOp(ID3, name, New Website, Website)

The operations of Alice and Bob are also recorded in the history log at Bob's site. His history log reads (with operation identifiers in the first column):

3: AOp(ID3, name, New Website, Website)
   1: OOp(Project, ID4, F, T, {name:Patent})
   2: OOp(Assignment, ID1-ID3, F, T, {role:lead})

The order of the operations in both history logs is different, but the identifiers of the operations are identical.

Figure 3:
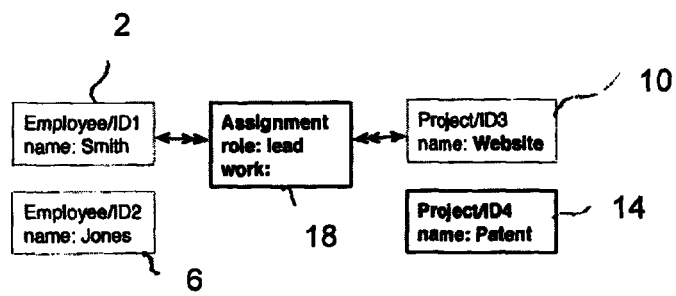
FIG. 3 a diagram of the object graph after the changes made by Alice and Bob have been integrated.

After the integration of Alice's and Bob's operations, the new state of the object graph is shown in FIG. 3. The object graph has the same state or is the same at Alice' and Bob's site (convergence).

Alice and Bob continue to concurrently make changes to the object graph. The next change made by Alice is displayed on the left side of FIG. 4. She changes the project lead for the website to Employee Jones, who is represented by object 6. This is expressed as a change of the dependent identifier of assignment object 18. The corresponding operation is an identifier operation 4: IOp(ID1-ID3, ID2-ID3)

Figure 4:
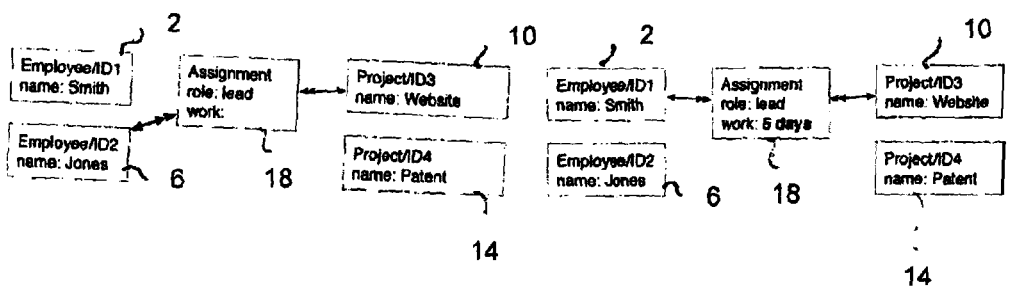
FIG. 4 two diagrams of the object graph with changes made by Alice (left side) and Bob (right side)

Concurrently, Bob makes an estimate of the work for the project lead, which results in an attribute operation 5: AOp(ID1-ID3, work, <NULL>, 5 days)

of which the effect is displayed on the right side of FIG. 4.

Figure 5:
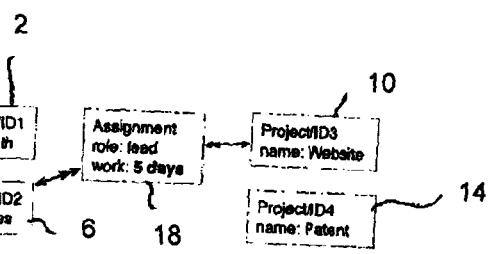
FIG. 5 a diagram of the object graph after the changes made by Alice and Bob have been integrated.

Again, the concurrent operations of Alice and Bob are integrated by transforming them against each other. The target identifier of Bob's new attribute operation is updated when it is transformed against Alice's identifier operation. The resulting object graph is shown in FIG. 5.

The history log of Alice is now:

1: OOp(Project, ID4, F, T, {name:Patent})
   2: OOp(Assignment, ID1-ID3, F, T, {role:lead})
   3: AOp(ID3, name, New Website, Website)
   4: IOp(ID1-ID3, ID2-ID3)
   5: AOp(ID2-ID3, work, <NULL>, 5 days)

The history log of Bob reads:

3: AOp(ID3, name, New Website, Website)
   1: OOp(Project, ID4, F, T, {name:Patent})
   2: OOp(Assignment, ID1-ID3, F, T, {role:lead})
   5: AOp(ID1-ID3, work, <NULL>, 5 days)
   4: IOp(ID1-ID3, ID2-ID3)

Alice changes the name of the project represented by object 14 with the identifier ID4 and assigns Employee Smith, who is represented by object 2, as a worker to the website project which is represented by object 10 with identifier ID3. This assignment is represented by an assignment object 20. The corresponding operations read 6: AOp(ID4, name, Patent, Patent 1)
   7: OOp(Assignment, ID3-ID1, F, T, {role:Worker, work: 10 days})

Figure 6:
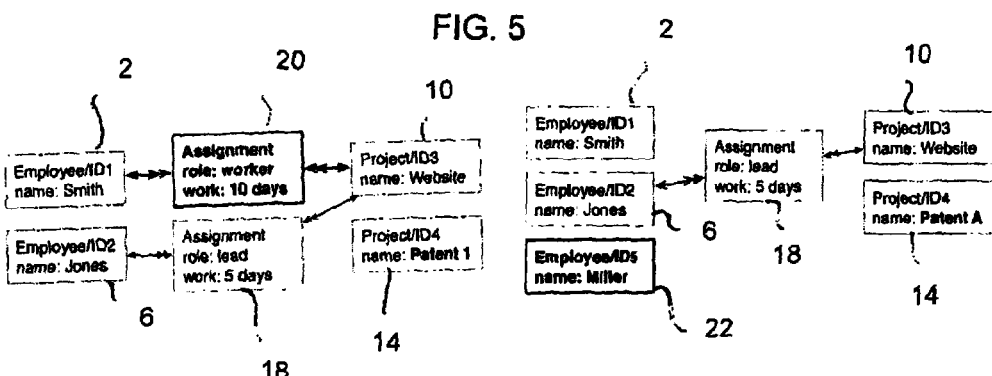
FIG. 6 two diagrams of the object graph with changes made by Alice (left side) and Bob (right side)

The state of the object graph after these operations have been applied is shown on the left side of FIG. 6.

Bob concurrently changes the project name of the project represented by object 14 and adds a new employee with name "Miller" by adding a new object 22. The object graph after his changes is shown on the right side of FIG. 6.

The corresponding operations read:

8: AOp(ID4, name, Patent, Patent A)
   9: OOP(Employee, ID5, F, T, {name: Miller}

The changes of the name of object 14, wherein Alice assigns to it the new name "Patent 1" and Bob assigns to it the new name "Patent A" form a tie, which means that integration of both operations into a common object graph state is not possible since these operations contradict themselves.

Figure 7:
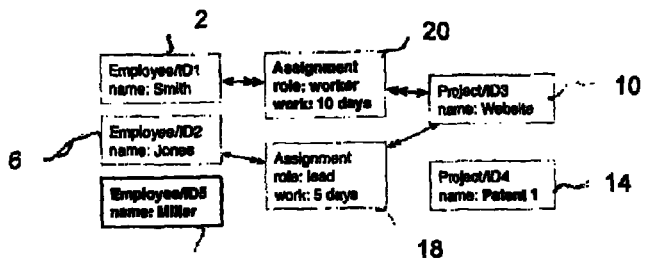
FIG. 7 a diagram of the object graph after the changes made by Alice and Bob have been integrated.

This tie is won by Alice, and the resulting object graph is shown in FIG. 7. The tie criterion in this example is chosen to be the alphabetical order of user names (Alice comes before Bob). Other choices are, of course, possible in real-world applications such as the time or time-stamp of a user action. If a time stamp is used, each event comprises this time stamp in addition to the atomic operation. If an event can contain several (more than one) atomic operations of the same user, it can also comprise a time stamp.

The history log of Alice now reads:

1: OOp(Project, ID4, F, T, {name:Patent})
   2: OOp(Assignment, ID1-ID3, F, T, {role:lead})
   3: AOp(ID3, name, New Website, Website)
   4: IOp(ID1-ID3, ID2-ID3)
   5: AOp(ID2-ID3, work, <NULL>, 5 days)
   6: AOp(ID4, name, Patent, Patent 1)
   7: OOp(Assignment, ID3-ID1, F, T, {role:Worker, work: 10 days})
   8: AOP(ID4, name Patent, Patent A, suppressed by op6)
   9: OOp(Employee, ID5, F, T, {name: Miller}

Bob's history log reads:
3: AOp(ID3, name, New Website, Website)
1: OOp(Project, ID4, F, T, {name:Patent})
2: OOp(Assignment, ID1-ID3, F, T, {role:lead})
5: AOp(ID1-ID3, work, <NULL>, 5 days)
4: IOp(ID1-ID3, ID2-ID3)
8: AOp(ID4, name, Patent, Patent A)
9: OOp(Employee, ID5, F, T, {name: Miller})
6: AOp(ID4, name, Patent, Patent 1, overwriting op8)
7: OOp(Assignment, ID3-ID1, F, T, {role: Worker, work: 10 days})

Figure 8:
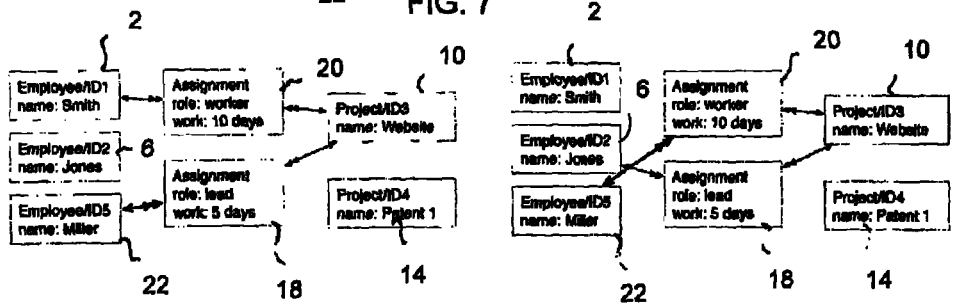
FIG. 8 two diagrams of the object graph with changes made by Alice (left side) and Bob (right side)

Alice and Bob perform further changes concurrently. Alice makes Employee Miller, represented by object 22, the project lead of the website project, which is represented by object 10. The object graph encompassing this change is shown in FIG. 8 on the left side. The corresponding operation is
10: IOp(ID2-ID3, ID5-ID3)

Bob makes Employee Miller, represented by object 22, the worker of the website project, which is represented by object 10. The object graph encompassing these changes is shown in FIG. 8 on the right side. The corresponding operation reads
11: IOp(ID1-ID3, ID5-ID3)

Figure 9:
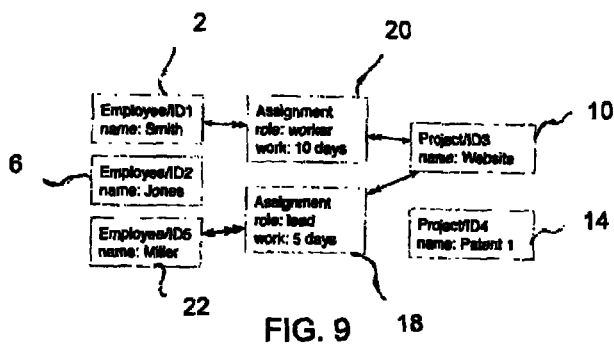
FIG. 9 a diagram of the object graph after the changes made by Alice and Bob have been integrated.

Both operations now need to be integrated to obtain the state of the object graph. However, the two changes lead to a conflict, which means that applying both operations to the object graph would lead to an object graph in an invalid state, since Employee Miller (object 22) cannot be assigned to the same project twice. A conflict event is created which records that operations with ids "10" and "11" are in conflict if both are executed. According to the tiebreak criterion, Alice' operation (10) wins. The conflict event records that operation "11" is forced into unexecuted state. The integration of Bobs changes continues after the conflict is resolved by unexecuting operation "11" and the conflict event is added to the history between the conflicting operations. The resulting object graph is shown in FIG. 9.

The history log of Alice now reads, wherein an ellipsis ( . . . ) denotes previous operations:
10: IOp(ID2-ID3, ID5-ID3, executed)
Conflict Event(op10, op11, forced=op11)
11: IOp(ID1-ID3, ID5-ID3, unexecuted)
Bob's history log reads:
. . .
11: IOp(ID1-ID3, ID5-ID3, unexecuted)
Conflict Event(op10, op11, forced=op11)
10: IOp(ID2-ID3, ID5-ID3, executed)

Alice deletes the project with ID4, represented by object 14. This is recorded as an object operation which changes an object state from existing to non-existing state:
12: OOp(Project, ID4, T, F, {name: Patent 1})

Figure 10:
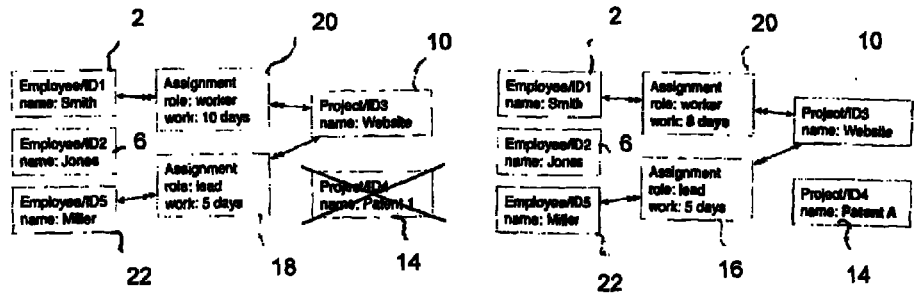
FIG. 10 two diagrams of the object graph with changes made by Alice (left side) and Bob (right side)
Figure 11:
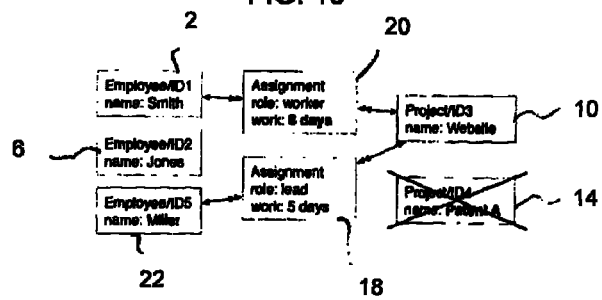
FIG. 11 a diagram of the object graph after the changes made by Alice and Bob have been integrated.

The object graph after this change is shown on the left side of FIG. 10.

Bob renames this project to "Patent A" and changes the work estimate for the worker assignment in object 20. The object graph after this change is shown on the right side of FIG. 10. The corresponding operations are
13: AOp(ID4, name, Patent 1, Patent A)
14: AOp(ID1-ID3, work, 10 days, 8 days)

In Alice's history log, Bob's operation is marked with "object is gone". In Bob's history log, the snapshot of Alice's operation is updated. Again, no information on the manipulations or changes of the object graph is lost.

Alice's history log now reads:
. . .
10: IOp(ID2-ID3, ID5-ID3, executed)
Conflict Event(op10, op11, forced=op11)
11: IOp(ID1-ID3, ID5-ID3, unexecuted)
12: OOp(Project, ID4, T, F, {name: Patent 1})
13: AOP(ID4, name, Patent 1, Patent A, object is gone)
14: AOp(ID1-ID3, work, 10 days, 8 days)
Bob's history log now reads:
. . .
11: IOp(ID1-ID3, ID5-ID3, unexecuted)
Conflict Event(op10, op11, forced=op11)
10: IOp(ID2-ID3, ID5-ID3, executed)
13: AOp(ID4, name, Patent 1, Patent A)
14: AOp(ID1-ID3, work 10 days, 8 days)
12: OOp(Project, ID4, T, F, {name: Patent A})

Figure 12:
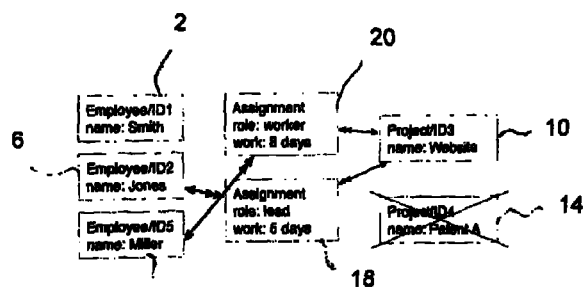
FIG. 12 a diagram of the object graph after Alice undid a change.

The state of the object graph after the integration of these operations is shown in FIG. 12.

The method according to the present invention enables a non-linear undo functionality (wherein for collaborative work regular linear undo of the changes of one user requires underlying non-linear undo support to leave integrated changes from other users intact), which means that user can at any time undo any previous operation, which is demonstrated in the following.

Alice now undos operation 10. This implicitly re-executes operation 11, because the conflict no longer forces operation 11 to be unexecuted. In order to generate the effect of Alice's undo on the object graph, two inverse operations are created:
IOp(ID5-ID3, ID2-ID3) undo-inverse of operation 10
IOp(ID1,-ID3, ID5-ID3) redo-inverse of operation 11

The context of each inverse operation at the time of creation is the context of its original operation plus that original operation. To transform the inverse operations to the current context of the object graph, they are transformed against all following operations in the history. At the same time these operations in the history are transformed against the inverse operations to remove the effect of the original operations from the history. This process is called transforming an inverse operation through the history.

These transformations change the ID of operation 14 in the history. The inverse operations are applied to the object graph and then discarded. The reversion is marked in the history log by a reversion event. This way, no information is lost on the manipulations of the object graph.

The new history of Alice reads:
. . .
10: IOp(ID2-ID3, ID5-ID3, unexecuted)
Conflict Event(op10, op11, forced=none)
11: IOp(ID1-ID3, ID5-ID3, executed)
12: OOp(Project, ID4, T, F, {name: Patent 1})
13: AOp(ID4, name, Patent 1, Patent A, object is gone)
14: AOp(ID5-ID3, work, 10 days, 8 days)
15: Reversion Event (op10, undo)

The state of the object graph after Alice's undo operation is shown in FIG. 12.

In the following, it is being demonstrated how the method according to the present invention in a preferred embodiment is avoiding the emergence or creation of cycles in the object graph. Cycles can be created, for example, when two or more concurrent operations are to be applied to an object graph which for themselves are valid, but in combination lead to a cycle.

Figure 13:
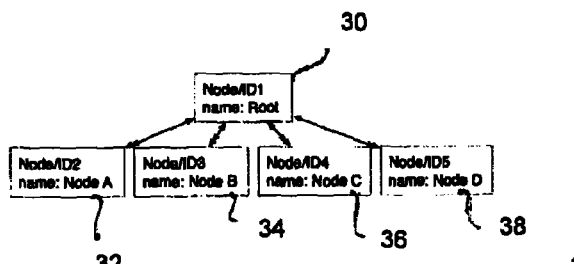
FIG. 13 a diagram of an initial state of another object graph with a root node and four children nodes.
Figure 14:
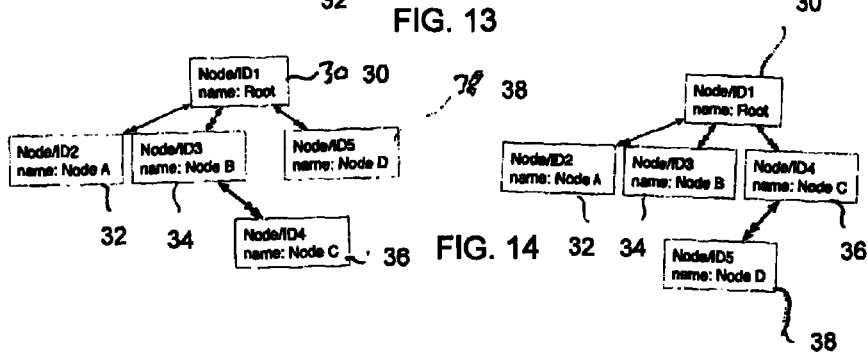
FIG. 14 two diagrams of the object graph with changes made by Alice (left side) and Bob (right side)

This is explained with an object graph of which the initial state is shown in FIG. 13. The object graph comprises one root node 30 with id ID1 which is the parent of four child nodes 32 ("Node A", ID2), 34 ("Node B", ID3), 36 ("Node C", ID4), 38 ("Node D", ID5). All objects 30, 32, 34, 36, 38 have the underlying class "Node". Alice moves node 36 under node 34 ("Node C" under "Node B"). The resulting state of the object graph is shown in FIG. 14 on the left side.

The corresponding tree operation has as old and new values the complete ancestor chains, expressed as a list of object IDs:

1: TOp(ID4, parent, ID1, ID3.ID1).

Bob concurrently moves node 38 under node 36, the tree operation reads:

2: TOp(ID5, parent, ID1, ID4.ID1)

The state of the object graph after this operation is shown in FIG. 14 on the right side.

During integration of both operations, the ancestor chain of operation 2 is adjusted when transforming against operation 1. Hence Alice's history log now reads:

1: TOp(ID4, parent, ID1, ID3.ID1)
2: TOp(ID5, parent, ID1, ID4.ID3.ID1)

Bob's history log now reads:

2: TOp(ID5, parent, ID1, ID4.ID1)
1: TOp(ID4, parent, ID1, ID3.ID1)

Figure 15:
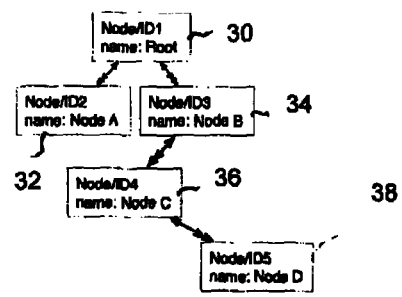
FIG. 15 a diagram of the object graph after the changes made by Alice and Bob have been integrated.

The state of the object graph after both changes are incorporated is shown in FIG. 15.

Alice now moves node 36 under node 34, the corresponding tree operation is

3: TOp(ID2, parent, ID1, ID3.ID1).

Figure 16:
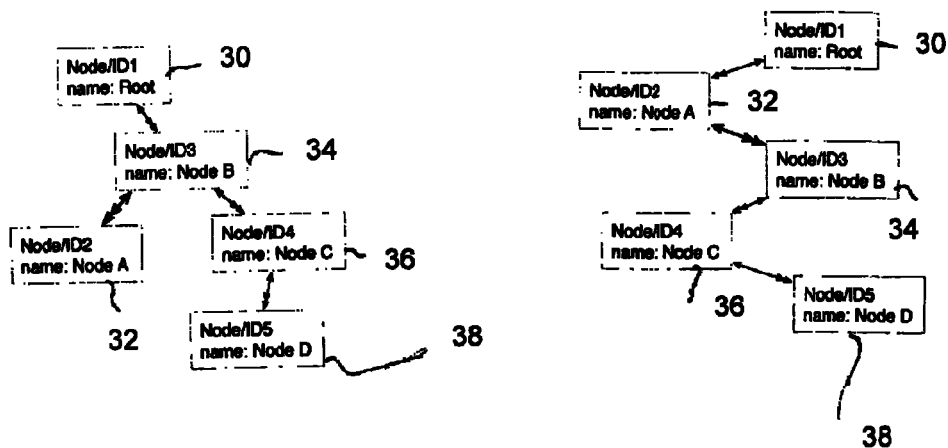
FIG. 16 two diagrams of the object graph with changes made by Alice (left side) and Bob (right side)

The state of the object graph after this operation has been applied is shown in FIG. 16 on the left side.

Bob concurrently moves node 34 under node 32, with tree operation

4: TOp(ID3, parent, ID1, ID2.ID1)

The state of the object graph after this operation has been applied is shown in FIG. 16 on the right side.

If both changes are applied together to the object graph, a cycle with nodes 32 (Node "A") and 34 (Node "B") would be formed. This is detected during transformation and one change is undone before integration is continued.

On Alice's side, operation 4 is transformed against operation 3, yielding an updated ancestor chain of operation 4:

4: TOp(ID3, parent, ID1, ID2.ID3.ID1)

This ancestor chain contains the target ID of the operation (ID3), which means that a cycle would be formed. A conflict event is created and resolved by unexecuting one of the operations according to the tiebreak criterion. The unexecuted operation in the history still shows the cycle. This is harmless because this operation can only be re-executed if operation 3 is first unexecuted, which will remove the cycle when the inverse is transformed through the history.

Alice's history log is:

. . .
3: TOp(ID2, parent, ID1, ID3.ID1, executed)
Conflict Event(op3, op4, forced=op4)
4: TOp(ID3, parent, ID1, ID2.ID3.ID1, unexecuted)

On Bob's side, operation 3 is transformed against operation 4 and obtains an updated ancestor chain:

3: TOp(ID2, parent, ID1, ID3.ID2.ID1)

Again, a cycle is detected and a conflict is created and resolved. This time the unexecuted event comes first in the history, therefore no cycle remains in the operations in the history log.

Bob's history log reads:

. . .
4: TOp(ID3, parent, ID1, ID2.ID1, unexecuted)
Conflict Event(op3, op4, forced=op4)
3: TOp(ID2, parent, ID1, ID3.ID1, executed)

Figure 17:
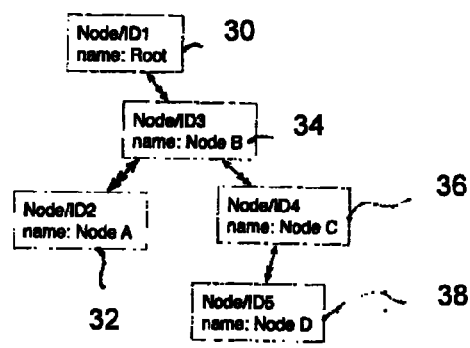
FIG. 17 a diagram of the object graph after the changes made by Alice and Bob have been integrated.

The state of the object graph after integration is shown in FIG. 17.

Figure 18:
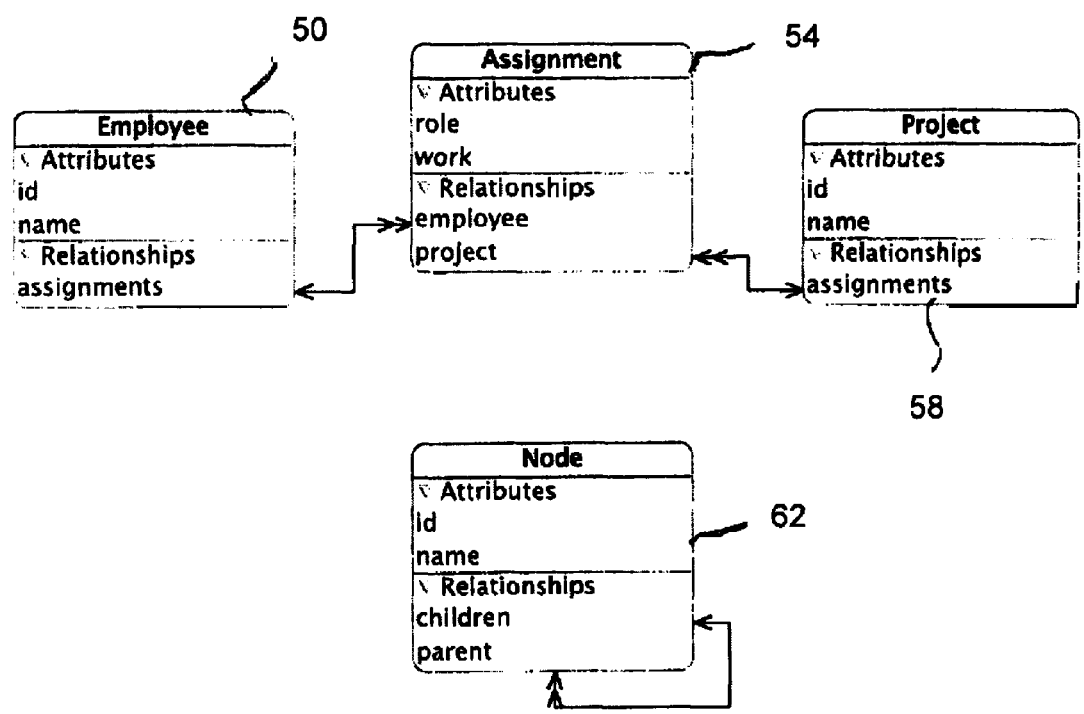
FIG. 18 a diagram of data models of objects of the object graphs according to FIGS. 1 to 12 and FIGS. 13 to 17.

In FIG. 18, a data model for objects is shown which is used for the preceding embodiment of the invention. Each class comprises properties, which are either attributes or relationships.

Shown are different classes and their members. An employee class 50 serves a blueprint for employee objects. It comprises the attributes id and name and a to-many relationship to assignment objects. An assignment class 54 comprises the attributes role and work and relationships to an employee and a project. A project class 58 comprises attributes id and name and a to-many relationship to assignment objects.

A node class 62 comprises attributes id and name and the relationships "children" and "parent", which are inverses of each other.

Figure 19:
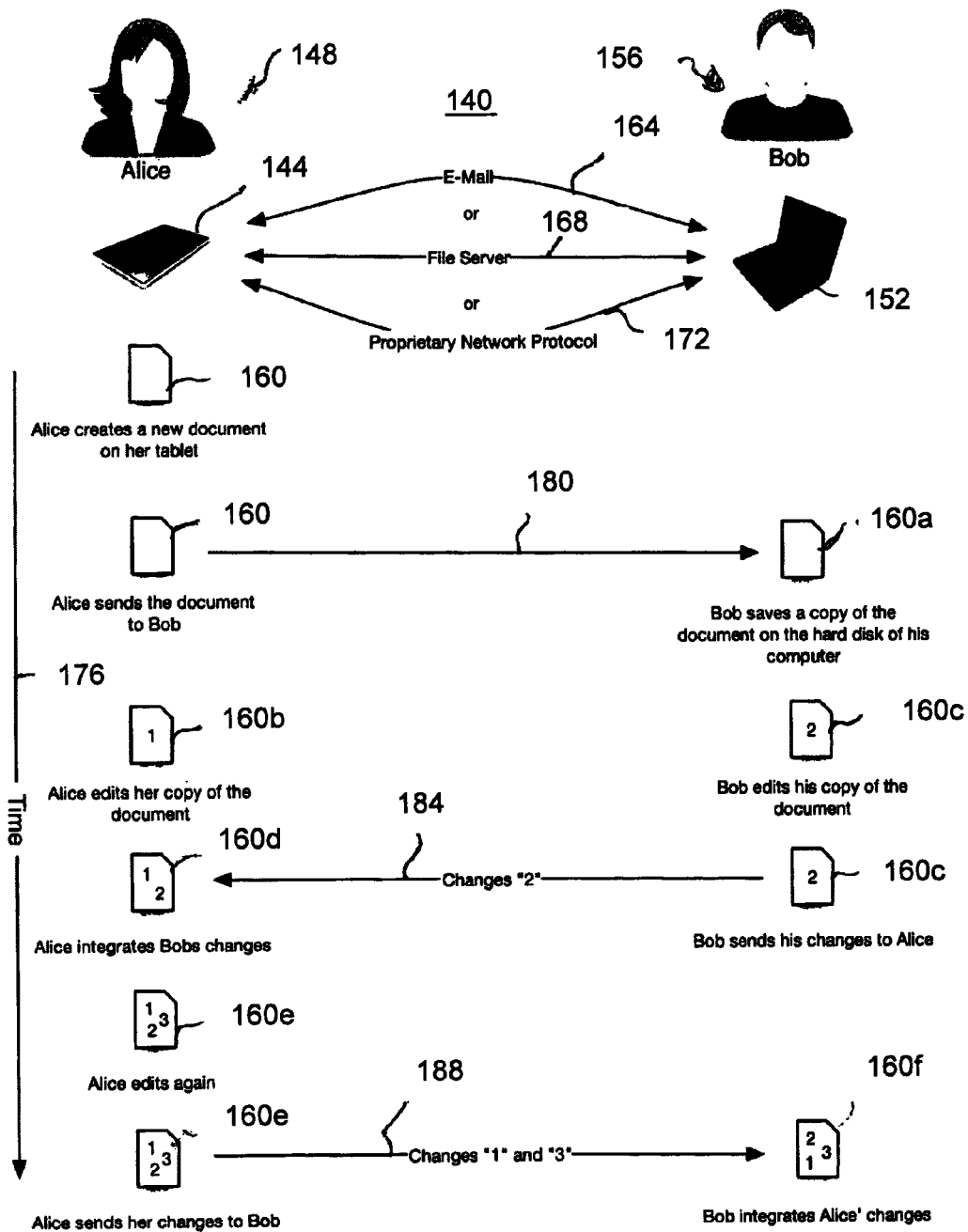
FIG. 19 a diagram of a first example showing a system of two computing devices of two users on which the method is executed and the data flow between these users.

In FIG. 19, a collaborative system 140 is shown, comprising a first computing device 144, which is built as a tablet computer and which is operated by a first user 148 named Alice, and further comprising a second computing device 152, which is built as a note book computer, which is operated by a second user named Bob 156. Computing devices 144, 152 have respectively loaded into their memory computing instructions which cause these devices to execute instruction according to the method according to the present invention.

Alice and Bob work collaboratively on a data structure or document 160 which is represented by an object graph. Alice and Bob exchange their respective versions of document 160 and/or the differences to the last or previous version of document 160 via at least one data channel of the group: exchange of emails 164, up- and downloading document 160 to a file server 168, transferring data via a proprietary (or open) network protocol 172. A time line 176 indicates the time order of successive events which are discussed in the following.

Alice sends document 160 to Bob over one of the aforementioned data channels 164, 168, 172, as indicated by arrow 180. Bob obtains a copy 160a of document 160 created by Alice and saves it to the hard disk of his computing device 152.

Alice edits her copy of document 160 which results in at least one change to document 160 and in a new version 160b of this document. Concurrently, Bob edits his copy 160a, resulting in at least one change, leading to a new version 160c. Bob sends his changes, i.e. differences between versions 160a and 160c, to Alice, as indicated by arrow 184. The changes which Alice transmits to Bob comprise atomic operations which are grouped in events, which again are grouped in commits. The computer program running an Alice' computing device 144 transforms Bob's changes against the changes she has done concurrently and integrates them into her document version, leading to a new version 160d.

Alice edits again her version, 160d, incorporating further changes, leading to a new version 160e. Alice sends her changes to Bob, indicated by arrow 188. On Bob's computing device 152, Alice' changes are integrated by the method, leading to a new document version 160f.

Figure 20:
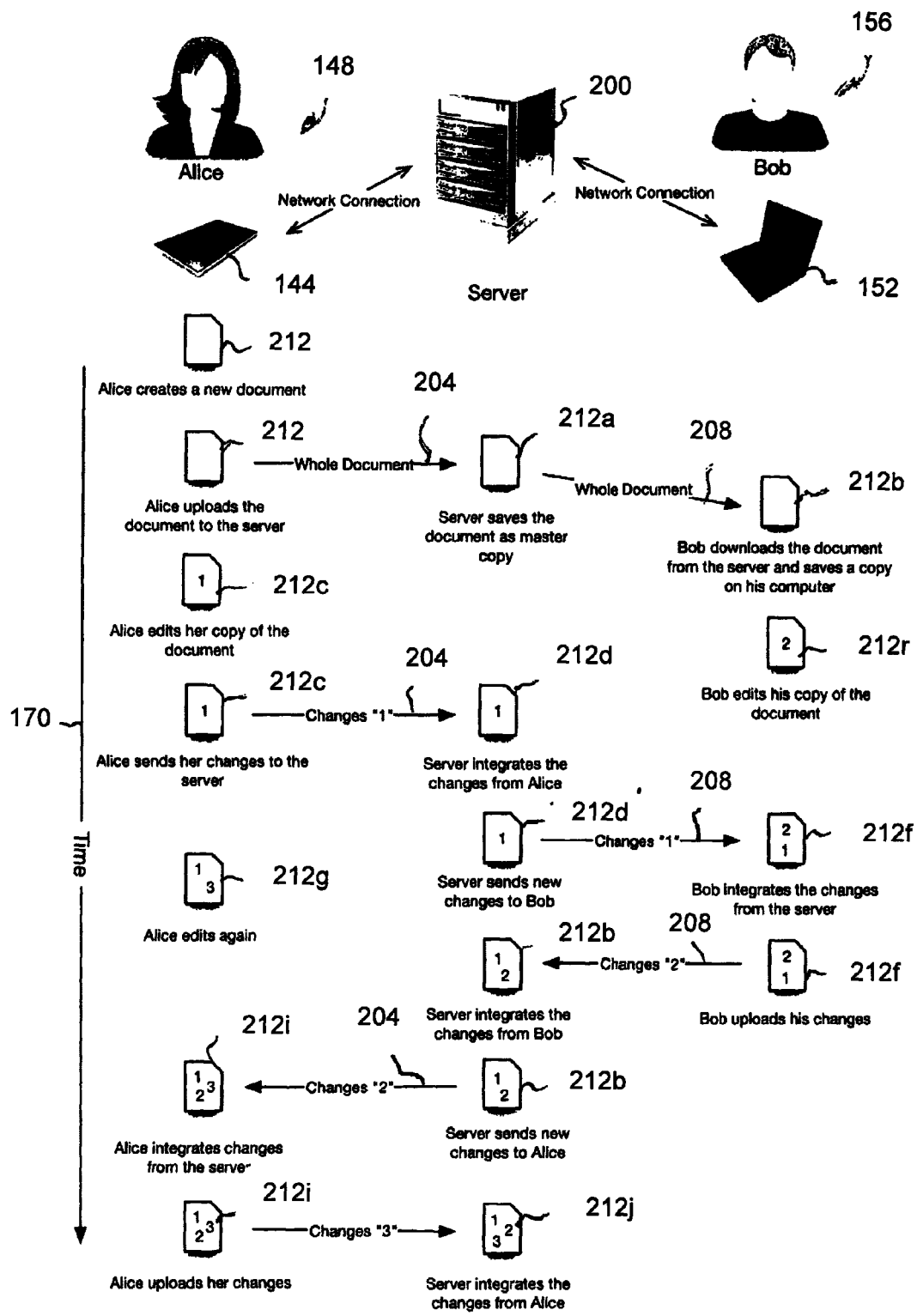
FIG. 20 a diagram of a second example showing a system of two computing devices of two users on which the method is executed and the data flow between these users.

In FIG. 20, another example of the two users Alice 148 and Bob 156 working collaboratively and concurrently on a document is shown. Alice 148 again works on her computing device 144 which is built as a tablet, and Bob 156 works on his computing device 152 which is built as a netbook. Computing devices 144, 152 have respectively loaded into their memory computing instructions which cause these devices to execute instruction according to the method according to the present invention.

The main difference of this example compared to the one discussed in relation with FIG. 20 is the exchange of changes made on the object graph between Alice and Bob. In the present example, both computing devices 144, 152 are connected to a common server 200 by data connections which allow both up- and download of data.

Alice creates a new document 212 on her tablet and sends it via data connection 204 to server 200, which stores a document 212a on that server, which becomes the master copy of the document for further collaborative editing. Via data connection 208, Bob downloads document 212a to his notebook and saves a document 212b which is a copy of document 212a. Alice meanwhile edits document 212, leading to a document 212c. Alice sends the changes made to document 212 via data connection 204 to server 200. On server 200, on which a method according to the present invention is performed, her changes are integrated, resulting in a file 212d. Bob edits his copy of the document, leading to a new version of that document 212e.

Bob downloads changes on file 212 made by Alice from the server through data connection 208. By the described method these changes are incorporated into Bob's version of the document, resulting in a new version 212f of the document. Alice meanwhile again edits her document 212c, resulting in a new document 212g.

Via data connection 208, Bob uploads his changes to server 200, resulting in a file 212h on server 200. Via data connection 204, these changes are downloaded to Alice's tablet and integrated into her document 212g, resulting in her new version 212i. Via data connection 204, she uploads her changes to server 200, which thereby receives document 212j.

The wording "Alice/Bob uploads her/his changes" implies automatic uploading to server 200 by the method according to the present invention.

The invention covers all variants of the method where two or more users collaboratively work on an object graph. For n users, user input of these n users is received, wherein for example of one user, user input is received directly on a computing device while the user is inputting commands on a keyboard, and user input of other users is received by mail. Each operation of a user is transformed against concurrently made transformations of other user in the way described above. The presented method ensures that all users obtain the same state of the object graph and are enabled to undo or redo any previous operation.

The following glossary contains descriptions and specifications of technical terms used throughout this application, which are preferred interpretations of these terms.

GLOSSARY

Attribute: A property with a "primitive" value. Primitive in this context means that the value does not relate to other objects in the graph and that it can be copied into an operation.
Branch: The commit history is organized in one master branch, which preferably starts from an empty object graph, and any number of user branches that diverge from the master branch at a split point. Branches describe independent developments of the object graph. The object graph can be switched between branches by shifting.
User branches can diverge only from the master branch. Sub branching from user branches is not supported.
Business Logic: Code implemented on the object graph. This code describes the allowed actions of the object graph and provides the user interface layer with an API to use and manipulate the model layer.
Commit: The smallest integratable unit, containing one or more events (regular, reversion or conflict). A commit is created whenever a save action is triggered, either by the user or via auto save. Commits are identified by a UUID.
Conflict Event: A special kind of event, which describes a conflict between other events. A conflict event contains the event IDs of the conflicting events together with the execution states that result in the conflict. If the conflict is resolved by changing the execution state of one of the conflicting events, the conflict event records which event is in forced state.
Dependent ID: An object identifier, which is built using one or several IDs of other objects. These identifiers better express the identity of objects that depend on other objects, like join objects.
Event ID: Identifier for an event. Combines the UUID of the commit the event belongs to with the index of the event inside its commit.
Execution State: An event can either be executed or unexecuted. Unexecuted events are marked as such but remain in the history. Their effect is removed from the history and object graph.
Forced State: If the execution state of an event is changed via a conflict event to resolve the conflict, it is considered to be in forced state. Changing its execution state again is only possible after another of the conflicting events has been forced.
History Digest: A value of constant size held on each commit, which is used to efficiently find a common point in two histories to base an integration on. The history digests of two commits are equal if the two histories up to these commits are comprised of the same set of commits regardless of their order. A one way cryptographic accumulator can be used to implement the history digest.
History: List of operations (grouped in events and commits), which define the current state of the object graph. The history is further organized in branches.
Inverse Operation: An operation undoing or redoing the effect of a regular operation. Operations carry enough information to create their inverses.
Join Object: An object which creates a join between two or more other objects (similar to a join table in relational database theory). A join object has to-one relationships to the joined objects, with the inverses of these relationships typically being to-many relationships.
Log: The combination of all commits and branches belonging to one object graph. The log describes the complete history of an object graph. The graph can be recreated from the log.
Object Graph: A set of objects that are connected by relationships and carry attributes. In the context of this paper, "object graph" refers to the set of objects that also carry the business logic and describe the user-visible state of the system.
Object Identifier: Operations address objects in the object graph by unique identifiers. Most objects use UUIDs as identifiers, but other identifiers like a unique name are possible (see Dependent ID). In some cases objects can change their identifier, which is recorded as an identifier operation.
Operation Context: The set of all previous operations in the history is called the context of an operation. Operations make sense in their context only. Two operations can be transformed against each other only if they have the same context.

Operation ID: Identifier for an operation. Combines the event ID of the owning regular event with the index of the operation inside this event.

Property: From the point of view of syncing, an object in the object graph consists of properties and is addressed by its identifier. Properties are identified by key strings and can be attributes or relationships.

Recording: The act of creating operations to record changes done by the user to the object graph.

(Regular) Event: The smallest undoable unit. A regular event contains one or more operations. A regular event is typically created by a single action of the user. If "event" is used without qualification, a regular event is meant.

(Regular) Operation: The smallest unit of the log, describing an atomic change to the object graph. Operations are recorded when the user edits the object graph. Operations are the subject of transformations. They are grouped in regular events. "Regular" is used to distinguish these operations from inverse operations.

Relationship: A property that has one or more other objects in the graph as its value. Preferably relationships are bidirectional, that is the target object of a relationship must itself have a relationship pointing back to the source object.

Relative Operation Context: Operation context relative to a start point in the history, that is the context is empty at that start point. Used during integration for the integration nodes with the start point being the common point of the two histories/branches in question.

Reversion Event: Records a single undo or redo initiated by the user. Reversion events are added to the top of the history when the undo or redo is performed. They contain the event ID of the event that is reverted and a flag indicating whether it is an undo or redo.

Shifting: The act of changing the state of the object graph from one commit to another commit. Typically used to change the object graph from its saved state to the head of a branch (user or master).

Split Point: The point at which a user branch diverges from the master branch. Splitting is possible between whole commits only.

Transformation: Operations are transformed against other operations to be able to integrate concurrently recorded operations into a single history. Transformation is possible between any two operations that are defined on the same operation context (that is the same state of the object graph). Afterwards the transformed operation has the other operation in its context, that is it is now defined on the object graph with the other operation applied.

The invention claimed is:

1. A computer-implemented method for maintaining consistency of a data structure, the method comprising the following steps:
   retrieving, at a computing device, a data structure that is built as an object graph containing a plurality of objects;
   receiving, at a computing device, first user input indicating a first set of changes on the object graph, the changes being atomic operations acting on the object graph;
   receiving, at a computing device, second user input indicating a second set of changes on the object graph, the changes being atomic operations acting on the object graph;
   accessing operational transformations, each transformation specifying how one atomic operation is transformed against another atomic operation;
   modifying the object graph to encompass the first set of changes and the second set of changes by employing the operational transformations on the atomic operations and applying the resulting transformed operations to the object graph; and
   storing the modified object graph in a computer-readable memory;
   wherein:
      the objects of the object graph include an identifier and at least one property, respectively;
      the transformed operations are recorded in a history log, wherein the history log comprises the atomic operations which are grouped in regular events, wherein a regular event comprises one or more atomic operations, wherein to each regular event an execution state is assigned which can either be "executed" or "unexecuted", and wherein a regular event with execution state "unexecuted" is kept in the history log and its effect on the object graph is removed;
   wherein:
      the atomic operations include:
         object operations that create or delete an object of the object graph;
         property operations that change a property of an object of the object graph;
   wherein:
      each of the operations retains the identifier of the object the operation acts on and information on each change of the object resulting from the operation; and
   wherein:
      when a transformation of two of the operations results in a conflict, creating a conflict event and adding the conflict event to the history log, wherein the conflict is resolved by changing the execution state of the event which comprises one of the operations resulting in a conflict and redoing the transformation, and wherein the conflict event records the changing of the execution state of this event and which events in which execution state are in conflict;
      when a transformation of two operations, wherein one of the two operations is transformed against the other of the two operations, results in a tie, assigning one of the two operations winning the tie by applying a tiebreak criterion, wherein if the transformed operation is losing the tie, it is marked as suppressed by the other operation, and wherein if the transformed operation is winning the tie, it is marked as overwriting the other operation, and wherein the transformed operation retains being suppressed by or overwriting the other operation.

2. The method according to claim 1, wherein the operations comprise identifier operations that change an identifier of an object of the object graph, and wherein:
   object operations retain a snapshot of the created or deleted object;
   identifier operations retain the old identifier value and the new identifier value;
   property operations retain the old property value and the new property value.

3. The method according to claim 2, wherein the property is either an attribute containing a serializable value or a relationship to another object in the object graph, and wherein the property operations comprise:

attribute operations that change the attribute of an object from an old value to a new value;

relationship operations that change the relationship of an object with respect to other objects.

4. The method according to claim 3, wherein, when a first and a second operation are transformed against each other, when the first operation is an object operation and the second operation is any of the operations, the first operation is transformed to provide an updated snapshot according to the second operation, and the second operation is transformed to hold information on its new existence state according to the first operation;

when the first operation is an object operation deleting a first object and the second operation is a relationship operation removing ownership of a second object from the first object, a conflict event is created and the second operation is reverted;

when the first operation is an object operation deleting a first object and the second operation is a relationship operation moving ownership of a second object into the first object, a conflict event is created and the second operation is reverted;

when the first operation is an object operation on a target object of which the snapshot comprises a relation to a related object, and wherein the second operation is a relationship operation acting on the related object which changes the relation to the target object to another object, wherein the related object does not own the target object, from the snapshot of the first operation the relationship to the related object is removed, and in the second operation the new existence state of the target object is recorded;

when the first operation is an object operation acting on a target object and the second operation is a relationship operation acting on related object which changes the relation of the target object from a third object to the target object, the relation is entered into the snapshot of the first operation, and in the second operation the new existence state of the target object is recorded;

when the first operation is an object operation creating a target object which carriers a relation to a related object in its snapshot and the second operation is a relationship operation acting on the related object and creating a relationship of the related object to a third object in the snapshot of the first operation the relationship to the second object is removed, and in the second operation, the change of relationship from the target object to the third object is entered;

when the first operation is an object operation deleting a target object and the second operation is an object operation creating a join object which involves the first object, a conflict event is created and the second operation is reverted;

when the first operation is an object operation acting on a target object which carriers a relation to a related object in its snapshot, and wherein the second operation is an object operation deleting the related object, the relationship to the related object is removed from the snapshot of the first operation, and the second operation remains unchanged;

when the first operation is an object operation acting on a target object and the second operation is an object operation creating a related object with a relationship to the target in its snapshot, in the snapshot of the first operation this relationship is entered and the second operation remains unchanged;

when the first operation is an identifier operation changing the identifier of a target object from an old value to a new value and the second operation is any of the operations containing the old value of the identifier of the target object as an identifier, as an attribute, or in the snapshot, the first operation remains unchanged and in the second operation, the old value is changed to the new value;

when the first operation is an identifier operation changing the identifier of a target object from an old value to a new value and the second operation is an object operation creating an object identified by the new value, a conflict event is created and the first operation is reverted;

when the first operation is an identifier operation changing the identifier from an old value to a new value and the second operation is an identifier operation changing the value of the identifier of another object to the new value, one of the operations is reverted by applying a tiebreak criterion.

5. The method according to claim 4, wherein for reverting a regular event in the history log, for the operations that belong to the regular event, inverse operations are created in reversed order, and wherein the inverse operations are transformed against all operations in the history log from this point on, and wherein the operations in the history log are transformed against the inverse operations, and wherein the resulting inverse operations are executed on the object graph and then discarded, and wherein the reverted regular event is marked as unexecuted and is kept in the history log at its original position, and wherein if the regular event takes part in one or more conflict events, for each such conflict event, if the execution state of the regular event is forced by the conflict event, or if the conflict event is not currently forcing any execution state, but the execution states of the conflicting events would be in conflict after the reversion of the regular event, the execution state of another regular event in the conflict event selected by a tiebreak criterion is forced before the regular event is reverted, and if the execution state of another regular event in the conflict event is forced, that event's execution state is reverted after the regular event is reverted.

6. The method according to claim 3, wherein the relationship operations comprise tree operations that retain as old and new values complete ancestor chains of the direct parent of an object to the root of an object tree built through one-to-many relationships between objects of the object graph.

7. The method according to claim 6, wherein a the tree operation that would create a cycle when applied to the object graph is detected during transformation against another tree operation for the same object tree by applying the other tree operation on the new ancestor chain value of the tree operation and checking whether the identifier of the object the tree operation being transformed is applied to occurs in the transformed ancestor chain.

8. The method according to claim 6, wherein the tree operations retain the inverse operation of every tree operation for the same object tree they are transformed against, and wherein after a potential cycle has been detected, a list of operations contributing to the cycle is built from the tree operation being transformed plus any the retained inverse operations which remove the cycle when applied to the transformed new ancestor chain value, and wherein a conflict event is created and recorded in the history log and wherein the event of which the execution state is changed for conflict resolution is selected from the list using a tiebreak criterion.

9. The method according to claim 1, wherein for undoing a regular event in the history log, the regular event is unexecuted and a reversion event referencing the regular event is created and appended to the history log, and wherein for redoing the regular event, it is executed again and another reversion event for the redoing of the regular event is appended to the history log.

10. The method according to claim 1, wherein one or more events in the history log build a commit to which a universally unique identifier is assigned.

11. The method according to claim 10, wherein the respective commit is identical to an event.

12. The method according to claim 10, wherein for integrating new commits from a first history log into a second history log, wherein both the history logs have a common origin and the first history log is called source log and the second is called target log, the following steps are performed:
    determining the most recent point with a common operation context shared by both history logs;
    for both history logs, building an integration node for each commit after the recent common point, wherein the integration node contains copies of the events of the commit;
    identifying each integration node with a node identifier which is unique during the integration procedure, wherein integration nodes for commits with the same identifier get the same node identifier;
    assigning to each integration node a relative operation context, which consists of the set of node identifiers of all integration nodes for commits which are less recent in the history than the commit of the integration node;
    transforming integration nodes with identical relative context against each other by, in a transforming step, transforming each operation of each event of the first the integration node against each operation of each event of the second the integration node in their original order, wherein the resulting operations from each transformation are used for the next transforming step, and creating two new integration nodes which contain the transformed operations and have the identifier of the respective other node in their relative operation context;
    building a two-level lookup structure for the integration nodes, of which a first key is the node identifier and a second key is a relative context;
    recursively transforming an integration node to a given relative context by employing the lookup structure;
    determining as a target relative context the set of node identifiers created from the target history log;
    iterating over the integration nodes created from the source history, wherein any integration node which is already present in the target history log is skipped, and transforming each of the integration nodes into the target context employing the recursive algorithm, wherein after each step, the identifier of the transformed node is added to the target context;
    creating new commit objects in the target history log from the transformed nodes, using the commit identifiers of the original commits in the source history and adding the events with the transformed operations from the transformed nodes to the new commits;
    applying the operations of the new commits on the object graph.

13. The method according to claim 10, wherein the history log is organized in branches which comprise different developments of the history of the object graph, wherein each branch is a list of commits, and wherein the history log starts with a master branch, and wherein other branches start at split points from existing branches.

14. The method according to claim 10, wherein for integrating new commits from a first history log into a second history log, wherein both the history logs have a common origin and the first history log is called source log and the second is called target log, the following steps are performed:
    determining the most recent point with a common operation context shared by both history logs;
    for both history logs, building an integration node for each commit after the recent common point, wherein the integration node contains copies of the events of the commit;
    identifying each integration node with a node identifier which is unique during the integration procedure, wherein integration nodes for commits with the same identifier get the same node identifier;
    assigning to each integration node a relative operation context, which consists of the set of node identifiers of all integration nodes for commits which are less recent in the history than the commit of the integration node;
    transforming integration nodes with identical relative context against each other by, in a transforming step, transforming each operation of each event of the first the integration node against each operation of each event of the second the integration node in their original order, wherein the resulting operations from each transformation are used for the next transforming step, and creating two new integration nodes which contain the transformed operations and have the identifier of the respective other node in their relative operation context;
    building a two-level lookup structure for the integration nodes, of which a first key is the node identifier and a second key is a relative context;
    recursively transforming an integration node to a given relative context by employing the lookup structure;
    determining as a target relative context the set of node identifiers created from the target history log;
    iterating over the integration nodes created from the source history, wherein any integration node which is already present in the target history log is skipped, and transforming each of the integration nodes into the target context employing the recursive algorithm, wherein after each step, the identifier of the transformed node is added to the target context;
    creating new commit objects in the target history log from the transformed nodes, using the commit identifiers of the original commits in the source history and adding the events with the transformed operations from the transformed nodes to the new commits; and
    applying the operations of the new commits on the object graph;
    wherein the history log is organized in branches which comprise different developments of the history of the object graph, wherein each of the branches is a list of commits, wherein the history log organized in the branches starts with a master branch and also has other branches that start at split points from existing branches, and wherein the integration algorithm is applied to branches of the same history log or to branches of different history logs.

15. The method according to claim 1, wherein the history log is kept indefinitely.

16. The method according to claim 1, wherein the respective object identifier is a universally unique identifier.

17. The method according to claim 1, wherein an object that joins at least two other objects is assigned a dependent object identifier that is built of the object identifiers of the joined objects.

18. The method according to claim 17, wherein the dependent object identifier is built by concatenating the object identifiers of the joined objects.

19. The method according to claim 1, wherein the respective event is identical to an atomic operation.

20. A non-transitory computer-readable storage device, coupled to a computer and having instructions stored thereon which, when executed on the computer, enable and/or cause the computer to perform operations for maintaining consistency of a data structure, the operations comprising the method according to claim 1.

21. A non-transitory computer-readable storage medium containing instructions which, when loaded into memory of and executed on a computer, enable and/or cause the computer to perform operations for maintaining consistency of a data structure, the operations comprising the method according to claim 1.

22. A computer program product, which is stored on a non-transitory computer-readable medium and can be loaded directly into memory of a computer, comprises software code sections which when executed on the computer enables and/or causes the computer to perform the method according to claim 1.

23. A system comprising:

at least one computing device;

a non-transitory computer-readable storage device, coupled to the computing device and having instructions stored thereon which, when executed on the computer, enable and/or cause the computer to perform operations for maintaining consistency of a data structure, the operations comprising the method according to claim 1.

24. A computer, comprising memory having stored thereon software code sections which when executed on the computer enable and/or cause the computer to perform the method according to claim 1.

25. A collaborative system, comprising at least two computers according to claim 24.

* * * * *